US010411850B2

(12) United States Patent
Noh et al.

(10) Patent No.: US 10,411,850 B2
(45) Date of Patent: Sep. 10, 2019

(54) APPARATUS AND METHOD FOR NETWORK ALLOCATION VECTOR OPERATIONS

(71) Applicant: NEWRACOM, INC., Irvine, CA (US)

(72) Inventors: Yujin Noh, Irvine, CA (US); Young Hoon Kwon, Laguna Niguel, CA (US); Sungho Moon, Irvine, CA (US)

(73) Assignee: Newracom, Inc., Lake Forest, CA (US)

( * ) Notice: Subject to any disclaimer, the term of this patent is extended or adjusted under 35 U.S.C. 154(b) by 132 days.

(21) Appl. No.: 15/246,376

(22) Filed: Aug. 24, 2016

(65) Prior Publication Data

US 2017/0064708 A1    Mar. 2, 2017

Related U.S. Application Data

(60) Provisional application No. 62/211,652, filed on Aug. 28, 2015.

(51) Int. Cl.
*H04W 72/04* (2009.01)
*H04L 5/00* (2006.01)
*H04W 74/08* (2009.01)
*H04W 84/12* (2009.01)

(52) U.S. Cl.
CPC ....... *H04L 5/0023* (2013.01); *H04W 74/0816* (2013.01); *H04W 84/12* (2013.01)

(58) Field of Classification Search
CPC ......... H04W 72/0446; H04W 74/0808; H04W 84/12; H04L 5/0023
USPC ........................................................ 370/329
See application file for complete search history.

(56) References Cited

U.S. PATENT DOCUMENTS

| 9,883,529 B2* | 1/2018 | Ghosh | H04W 74/06 |
| 2015/0036572 A1* | 2/2015 | Seok | H04W 52/0216 370/311 |
| 2016/0227533 A1* | 8/2016 | Josiam | H04W 74/006 |
| 2016/0227565 A1* | 8/2016 | Ghosh | H04W 72/1268 |
| 2016/0262173 A1* | 9/2016 | Josiam | H04B 7/0452 |
| 2017/0208625 A1* | 7/2017 | Choi | H04L 27/26 |
| 2017/0273140 A1* | 9/2017 | Ryu | H04W 84/12 |
| 2017/0295560 A1* | 10/2017 | Kim | H04W 84/12 |

OTHER PUBLICATIONS

U.S. Appl. No. 62/201,116, filed Aug. 5, 2015.*

(Continued)

*Primary Examiner* — Faisal Choudhury
(74) *Attorney, Agent, or Firm* — Morgan, Lewis & Bockius LLP

(57) ABSTRACT

In wireless communications, an access point may send a trigger frame to multiple stations. The trigger frame may include a carrier sense required subfield that can be set to a first state or a second state. The carrier sense required subfield indicates whether the stations are required to consider a status of carrier sensing in determining whether or not to respond to the trigger frame. A station that receives a trigger frame having the carrier sense required. subfield set to the first state may send a response at a predetermined time interval without performing a carrier sense operation. A station that receives a trigger frame having the carrier sense required subfield set to the second state may determine whether to send a response based on performing a carrier sense operation.

20 Claims, 17 Drawing Sheets

(56) References Cited

OTHER PUBLICATIONS

LAN/MAN Standards Committee of the IEEE Computer Society. "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

\* cited by examiner

APPARATUS AND METHOD FOR NETWORK ALLOCATION VECTOR OPERATIONS

CROSS-REFERENCE TO RELATED APPLICATIONS

This application claims the benefit of priority from U.S. Provisional Application No. 62/211,652, entitled "APPARATUS AND METHODS FOR NAV OPERATION," filed Aug. 28, 2015, the entirety of which is incorporated herein by reference,

TECHNICAL FIELD

The present description relates in general to wireless communication systems and methods, and more particularly to, for example, without limitation, network allocation vector operations.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many efficiency WLAN deployments. With the real-time requirements of some of these applications. WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

Figure 1:
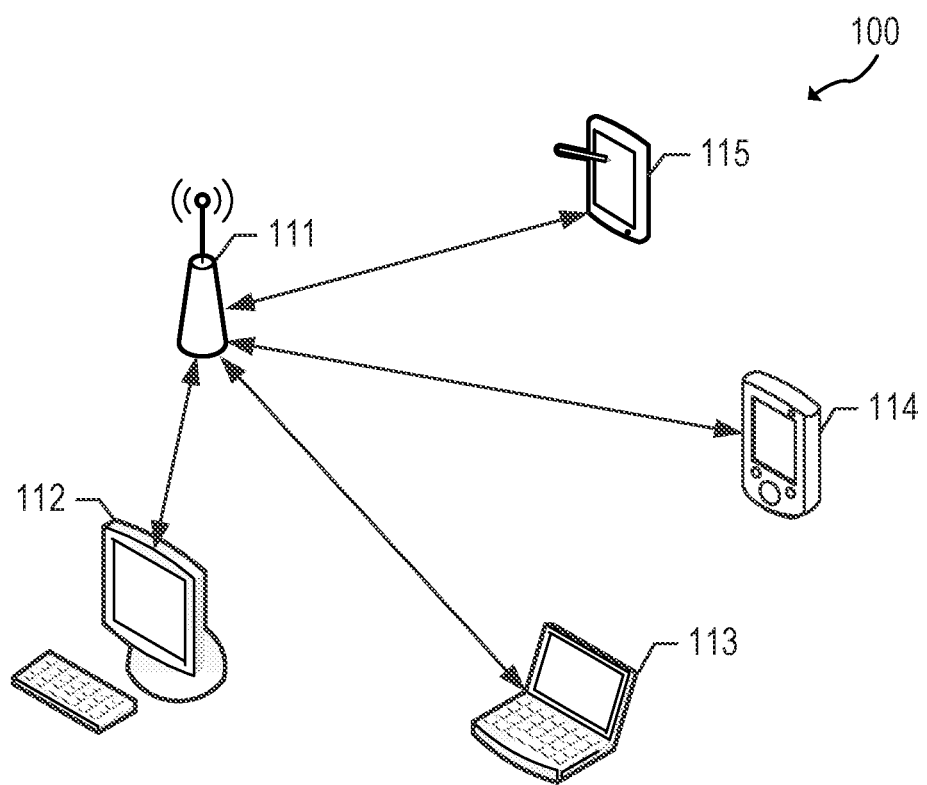
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Systems and methods are disclosed for facilitating medium access for multi-user (MU) transmissions. One or more implementations of such systems and methods may provide an indication whether stations (STAs) are required to consider the status of the medium in determining whether or not to respond to a trigger frame from an access point (AP). In one or more implementations, an AP may transmit a trigger frame to facilitate one or more uplink (UL) MU transmissions. The trigger frame may be utilized to solicit response frames from one or more stations. For simultaneous response frames, the one or more stations may transmit their response frames using UL MU transmission technology, such as UL MU orthogonal frequency division multiple access (OFDMA) and/or UL MU multi-input multi-output (MIMO).

A trigger frame may be a frame sent by an AP that seeks data, control, or management frame response(s) from stations that participate in a subsequent UL MU frame. The trigger frame may be utilized to initiate an MU transmission in OFDMA or MEMO. In an aspect, a trigger frame may include, for example, some or all of the following features: (a) a list of stations (STAs) that an access point (AP) seeks a response from; (b) resource allocation information for each STA (e.g., a subband assigned to each STA); (c) a channel assessment indication, and/or (d) attributes of the expected UL MU frame, such as the duration, bandwidth, etc., among other features. In other words, a trigger frame may be used to allocate resource for UL MU transmission and to solicit an UL MU transmission from the participating stations in response to the trigger frame. A trigger frame may carry other information required by a responding STA to send a UL MU frame. The term "resource" may refer to, for example, a bandwidth (e.g., a subband(s), frequencies, frequency band(s)), time/duration that the STAs expect to occupy a transmission medium, and/or possibly a number of spatial streams that the STAs may use.

In one or more implementations of IEEE 802.11 WLANs, a UL MU physical layer convergence procedure (PLCP) protocol data unit (PPDU) (e.g., MU-MIMO or OFDMA) is sent as a response (e.g., an immediate response) to a trigger frame sent by an AP. The UL MU PPDUs may be, for example, referred to as trigger-based UL MU PPDUs, trigger-based UL PPDUs. HE trigger-based UL MU PPDU response, or a variant/combination thereof (e.g., HE trigger-based UL MU PPDUs).

The distributed nature of channel access to networks such as the IEEE 802.11 WLANs can be accommodated using a carrier sense mechanism for collision free operation. In one or more implementations, the physical carrier sense of one STA may be responsible for detecting the transmissions of other STAs. However, in some scenarios, it may be difficult or impossible to detect all other STAs. For example, one STA which may be a long distance away from another STA that is transmitting frames (e.g., a hidden node) may see the medium as idle and may also begin transmitting frames. To overcome issues associated with hidden nodes, network allocation vector (NAV) operations may be performed, However, as the IEEE 802.11 standard evolves to include multiple users' simultaneous transmission/reception scheduled within a basic service set (BSS) such as UL/DL MU transmission in cascaded manner, a modified or newly defined mechanism as described. herein can improve efficiency of MU transmissions.

In some aspects, a method of cascaded operations includes DL/MU transmissions within a transmission opportunity (TXOP). The method may include receiving a trigger frame at a STA from an AP. The trigger frame may include a subfield with an indication associated with carrier sensing. The indication may have a first state or a second state. The first state may indicate that carrier sensing should be performed at the STA. The second state may indicate that carrier sensing should not be performed at the STA. In scenarios in which the trigger frame received at a STA includes a carrier-sensing indication having the second state, the STA may transmit a second frame to the AP without performing carrier sensing including, without limitation, checking the NAV state. In scenarios in which the trigger frame received at a STA includes a carrier-sensing indication having the first state, the STA may perform carrier sensing (e.g., a NAV check) and may transmit the second frame only under certain conditions when the NAV check indicates that NAV is idle, which can occur when the NAV count is 0 or when the NAV count is nonzero but the nonbandwidth signaling TA obtained from the TA field of the trigger frame matches the saved TXOP holder address).

More particularly, in sonic embodiments, the method may include saving, at the STA, a TXOP holder address associated with a frame that initiates a frame exchange sequence. Later, the STA with the saved TXOP holder address may receive a first frame (e.g., a trigger frame) from an AP with a TA that solicits a second frame transmission from a set of STAs addressed in the first frame. When the e first frame includes a carrier-sensing subfield set to a non-zero value such as one, the method may further include performing a carrier sensing including, without limitation, checking the NAV state, and transmitting a second frame (e.g., simultaneously with the set of addressed STAs) in a MU MIMO transmission or OFDMA transmission when the NAV indicates idle (e.g., (a) when the NAV count is zero or (b) when the NAV count is nonzero but the nonbandwidth signaling TA (e.g., a TA in which the Individual/Group bit in the transmitter address is set to 0) obtained from the TA field of the first frame matches the saved TXOP holder address). When the first frame includes the carrier-sensing indication set to a value of zero, the method may direct the STA(s) to transmit a second frame without performing the carrier sensing including, without limitation, without checking the NAV state. The method may further include transmitting a second frame as a UL MU transmission simultaneously by a set of addressed STAs as a response to the first frame.

With respect to nonbandwidth signaling TAs, the TA field may contain, for example, an IEEE MAC address that identifies the STA that has transmitted, onto the WM, the MPDU contained in the frame body field. If the Individual/Group bit is 0, then the TA field is the individual address of the STA; otherwise, the TA field is a bandwidth signaling TA, indicating that the frame carries additional information in the scrambling sequence.

A bandwidth signaling TA may be considered a TA that is used by a very high throughput (VHT) station (STA) to indicate the presence of additional signaling related to the bandwidth to be used in subsequent transmissions in an enhanced distributed channel access (EDCA) transmission opportunity (TX0P). A bandwidth signaling TA may be indicated with the IEEE medium access control (MAC) individual address of the transmitting VHT STA but with the Individual/Group bit set to 1. In other words, for a nonbandwidth signaling TA, the TA field may be used to indicate the address of the TA. However, for a bandwidth signaling TA, the TA field may be used to indicate whether bandwidth information is carried in the scrambling sequence where, for example, 2-3 bits are assigned for bandwidth size among 7 bits.

Various exemplary scenarios for STAs that are addressed by an RTS frame and that check NAV for bandwidth signaling and nonbandwidth signaling TAs will now be described. In a first set of exemplary scenarios, a non-VHT STA is addressed by an RTS frame, or a VHT STA is addressed by an RTS frame carried in a non-HT or non-HT duplicate PPDU that has a nonbandwidth signaling TA, or a VHT STA is addressed by an RTS frame in a format other than non-HT or non-HT duplicate. In any of the first set of exemplary scenarios, if the NAV indicates idle, the STA may respond with a CTS frame after a SIFS. Otherwise, the STA may not respond with a CTS frame.

In a second set of exemplary scenarios, a VHT STA is addressed by an RTS frame in a non-HT or non-HT duplicate PPDU that has a bandwidth signaling TA and that has the RXVECTOR parameter DYN_BANDWIDTH_IN_NON_HT equal to Static. In any of the second set of exemplary scenarios, if the NAV indicates idle and CCA has been idle for all secondary channels in the channel width indicated by the RTS frame's RXVECTOR parameter CH_BANDWIDTH_IN_NON_HT for a PIFS prior to the start of the RTS frame, then the STA may respond with a CTS frame carried in a non-HT or non-HT duplicate PPDU after a SIFS (e.g., with the CIS frame's TXVECTOR parameters CH_BANDWIDTH and CH_BANDWIDTH_IN_NON_HT set to the same value as the RTS frame's RXVECTOR parameter CH_BANDWIDTH_IN_NON_HT). Otherwise, the STA may not respond with a CTS frame.

In a third set of exemplary scenarios, a VHT STA is addressed by an RTS frame in a non-HT or non-HT duplicate PPDU that has a bandwidth signaling TA and that has the RXVECTOR parameter DYN_BANDWIDTH_IN_NON_HT equal to Dynamic. In any of the third set of exemplary scenarios, if the NAV indicates idle, then the STA may respond with a CTS frame in a non-HT or non-HT duplicate PPDU after a SIFS, where the CTS frame's TXVECTOR parameters CH_BANDWIDTH and CH_BANDWIDTH_IN_NON_HT may be set to any channel width for which CCA on all secondary channels has been idle for a PIFS prior to the start of the RTS frame and that is less than or equal to the channel width indicated in the RTS frame's RXVECTOR parameter CH_BANDWIDTH_IN_NON_HT. Otherwise, the STA may not respond with a CTS frame.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
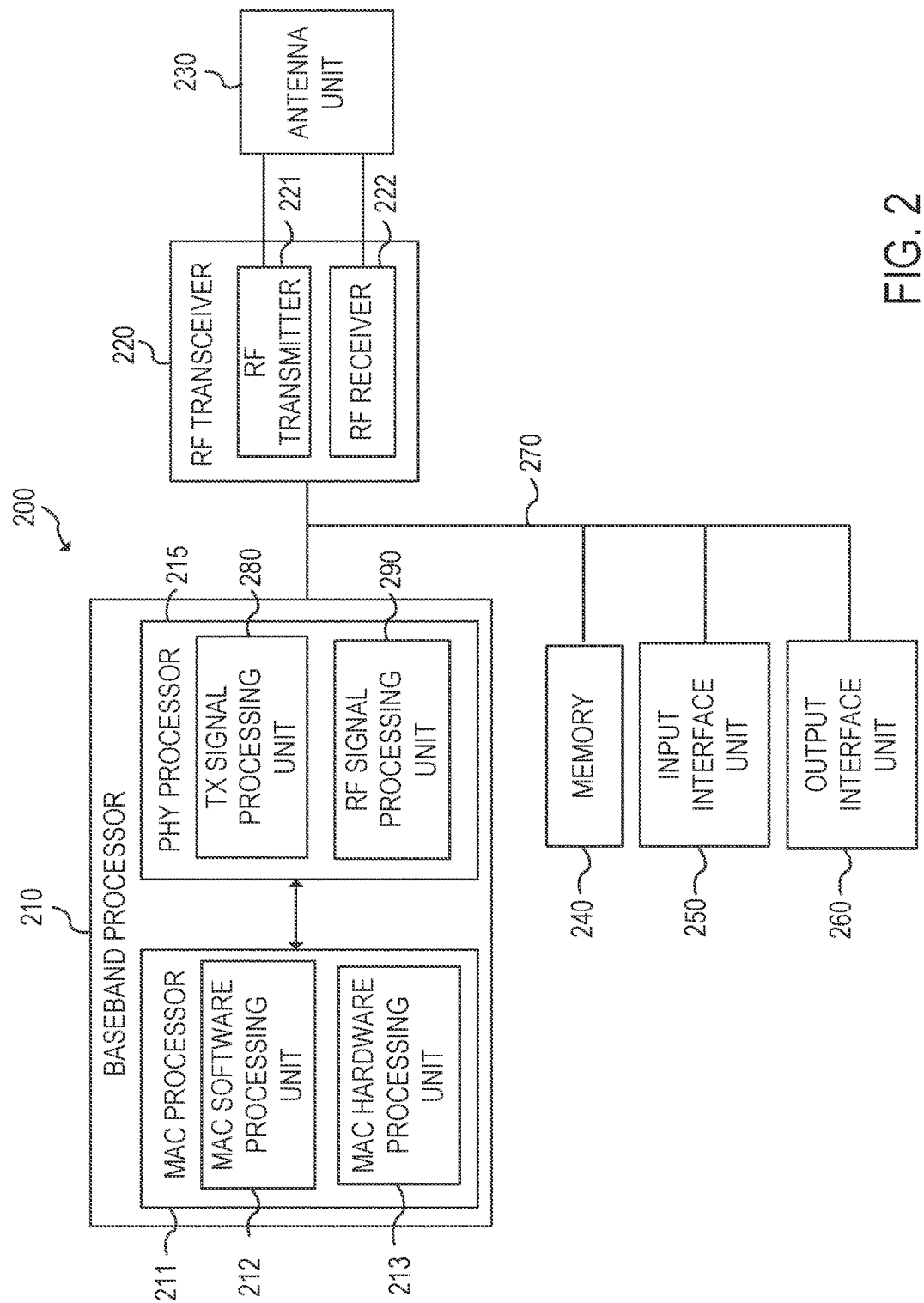
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband. processor 210 with the memory 240. From the memory 240, the baseband. processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media, in one or more aspects, a computer-readable medium is a tangible computer-readable medium, a computer-readable storage medium, anon-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented. method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus e.g., a wireless communication device 200) to perform operations or a method of the subject disclosure.

Figure 3:
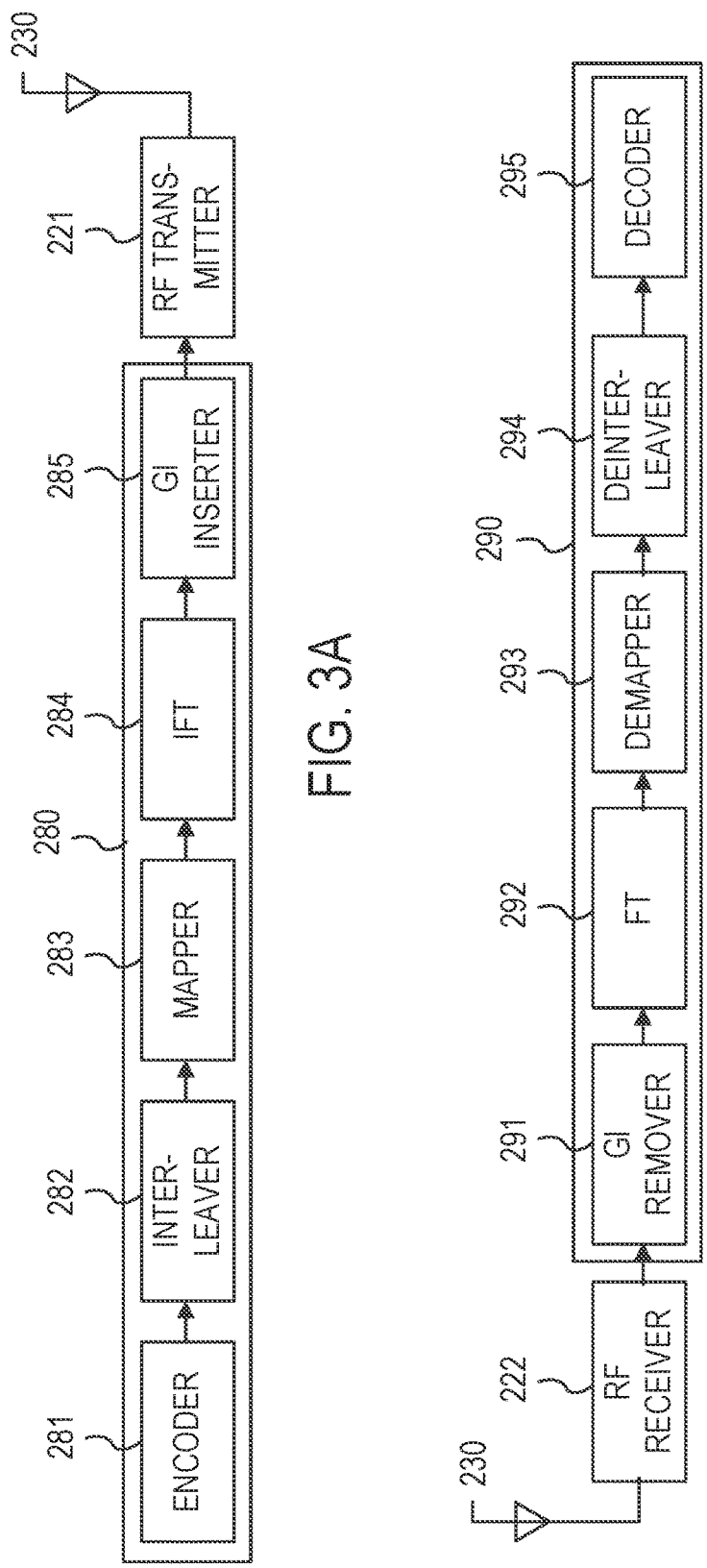
FIG. 3A illustrates a schematic block diagram of an example of a transmitting signal processor in a wireless communication device.
FIG. 3B illustrates a schematic block diagram of an example of a receiving signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams (NSS). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams (NSTS) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the (31 from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams, If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

Figure 4:
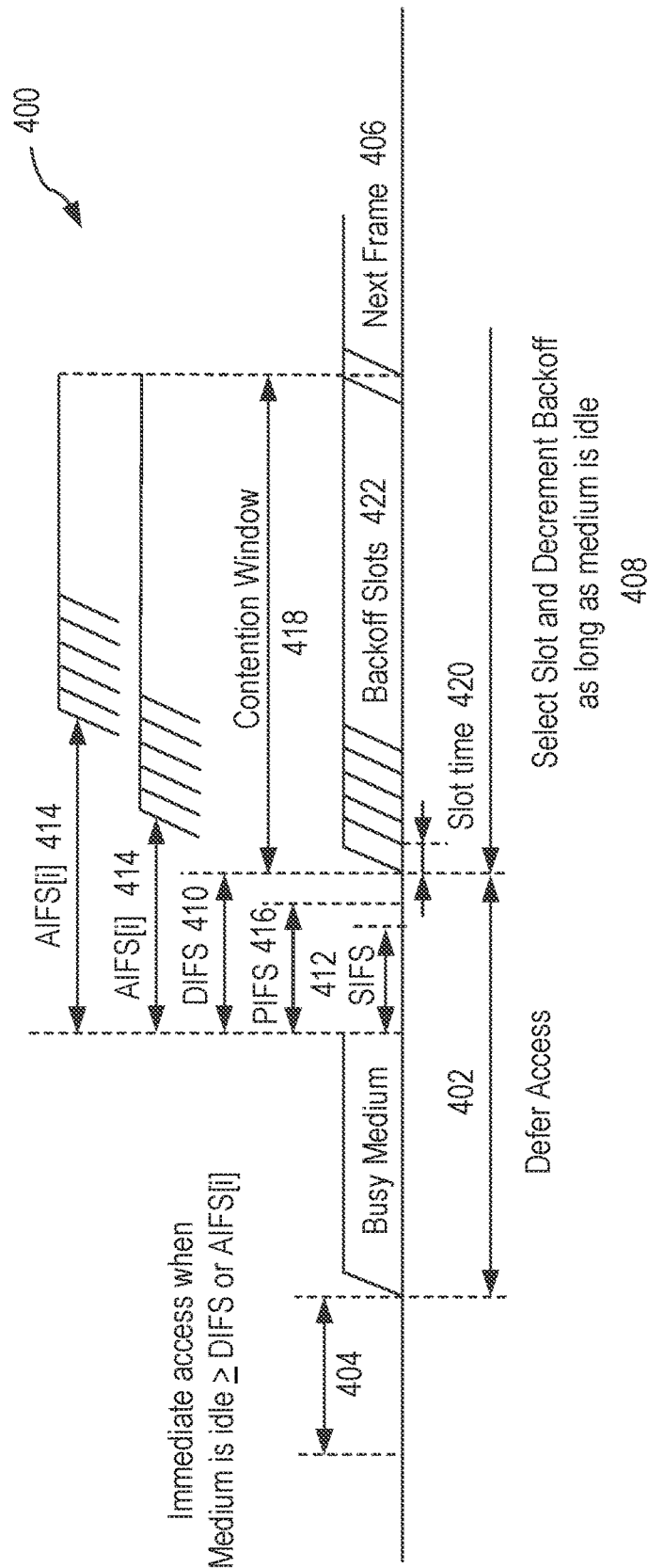
FIG. 4 illustrates an example of a timing diagram of interframe space (IFS) relationships.

The decoder 295 decodes the streams output from the deinterleaver 294 and/or the stream deparser. For example, the decoder 295 may be an FEC decoder. The FEC decoder may include a BCC decoder or an LDPC decoder., FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

In an aspect, the one or more backoff slots 422 may be collectively referred to as a backoff time. In an aspect, the backoff time may be based on a random (e.g., pseudorandom) number within a predetermined interval. For instance, the backoff time may be based on a pseudorandom integer drawn from a uniform distribution over the interval [0, CW], where CW is an integer within the range of values of the PHY characteristics aCWmin and aCWmax such that aCWmin≤CW≤aCWmax. In an aspect, CW may refer to, or may be referred to as, a contention window size, contention window duration, contention window parameter, or a variant thereof.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WAN device transmits the control frame without performing backoff if a short IFS (SIFS) 412 has elapsed. For example, the SIFS may be 16 microseconds. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
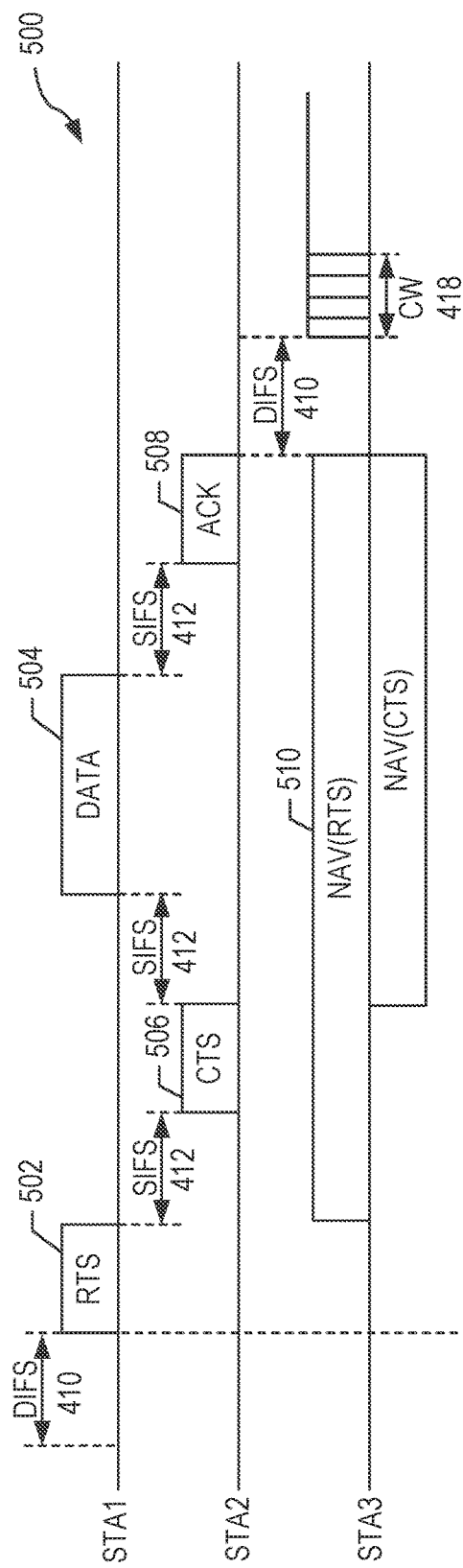
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1,. STA2) during the DIFS 410 after the NAV timer has expired, the STA3 may attempt the channel access after a contention window 418 has elapsed. In this example, the contention window 418 may be based on a random backoff.

Figure 6:
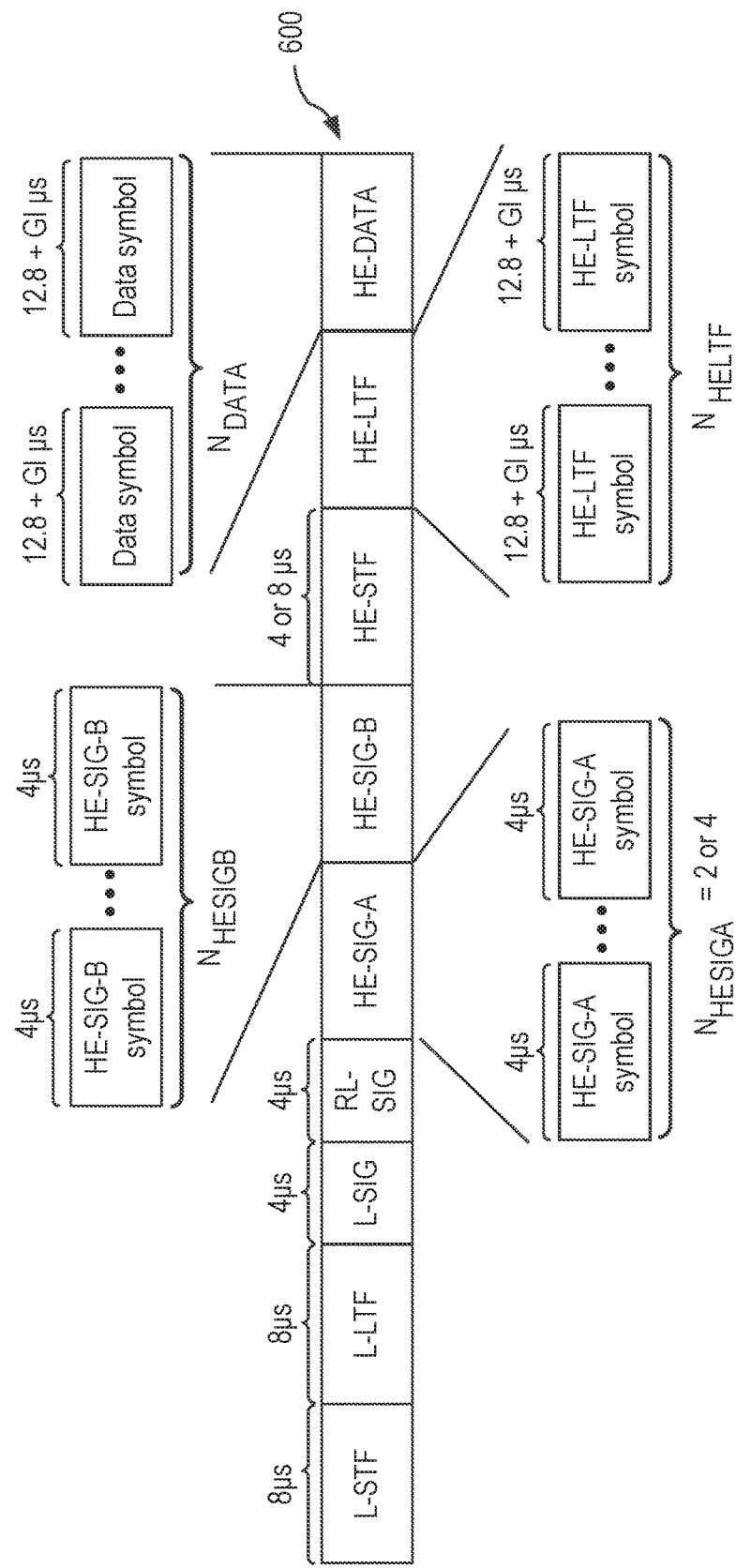
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include NHESIGA symbols, the HE-SIG-B field may include NHESIGB symbols, the HE-LTF field may include NHELTF symbols, and the HE-DATA field may include NDATA symbols. In an aspect, the HE-DATA field may also be referred to as a payload field, data, payload, PSDU, or Media Access Control (MAC) Protocol Data Units (MPDU) (e.g., MAC frame).

In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation hero.; (e.g., without any or some portions of an HE header).

Table 1, shown below, provides examples of characteristics associated with the various components of the HE frame 600.

TABLE 1

| PPDU Frame | | | | | | |
|---|---|---|---|---|---|---|
| Element | Definition | Duration | DFT period | GI | Subcarrier Spacing | Description |
| Legacy(L)-STF | Non-high throughput (HT) Short Training field | 8 µs | — | — | equivalent to 1,250 kHz | L-STF of a non-trigger-based PPDU has a periodicity of 0.8 µs with 10 periods. |
| L-LTF | Non-HT Long Training field | 8 µs | 3.2 µs | 1.6 µs | 312.5 kHz | |
| L-SIG | Non-HT SIGNAL field | 4 µs | 3.2 µs | 0.8 µs | 312.5 kHz | |
| RL-SIG | Repeated Non-HT SIGNAL field | 4 µs | 3.2 µs | 0.8 µs | 312.5 kHz | |
| HE-SIG-A | HE SIGNAL A field | $N_{HESIGA}$ * 4 µs | 3.2 µs | 0.8 µs | 312.5 kHz | HE-SIG-A is duplicated on each 20 MHz segment after the legacy preamble to |

TABLE 1-continued

| Element | Definition | Duration | DFT period | GI | Subcarrier Spacing | Description |
|---|---|---|---|---|---|---|
| | | | | | | indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. Single user (SU) packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is a UL PPDU sent in response to a trigger frame. |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM |

TABLE 1-continued

| | | | | | | |
|---|---|---|---|---|---|---|
| Element | Definition | Duration | DFT period | GI | Subcarrier Spacing | Description |
| HE-DATA | HE DATA field | $N_{DATA}$ * (DFT period + GI) μs | 12.8 μs | supports 0.8, 1.6, 3.2 μs | 78.125 kHz | symbol in time domain. $N_{HELTF}$ means the number of HE-LTF symbols and is equal to 1, 2, 4, 6, 8. $N_{DATA}$ means the number of HE data symbols. |

In various aspects, multi-user (MU) transmission refers to communications in which multiple frames are transmitted to or from multiple STAs simultaneously using different resources, wherein examples of different resources are different frequency resources in OFDMA transmission and different spatial streams in MU-MIMO transmission. Therefore, DL-OFDMA, DL-MU-MIMO, UL-OFDMA, and UL-MU-MIMO are examples of MU transmission. In some aspects, a UL MU transmission may include a frame exchange sequence of the following frames: a trigger frame, a uplink MU frame, and an acknowledgement frame.

In one or more implementations, an AP may trigger UL MU transmission(s) using a trigger frame. In some aspects, the UL MU transmissions may include UL MU-MIMO and/or UL OFDMA triggered by the AP. Triggered stations may transmit MU transmissions as a response to the trigger frame sent by the AP. The trigger frame can contain information about the characteristics of the MU transmission and/or information about the characteristics of the packets to be transmitted by the stations in the corresponding MU transmissions.

A trigger frame can include an indication related to a channel assessment. In some aspects, one of the indicated characteristics in the trigger frame can be a CS required subfield. For example, the CS required subfield of the trigger frame may be an indication to a receiving STA of whether a carrier sense (e.g., an energy detect or a NAV check) should be performed before the STA responds to the trigger frame.

Figure 7:
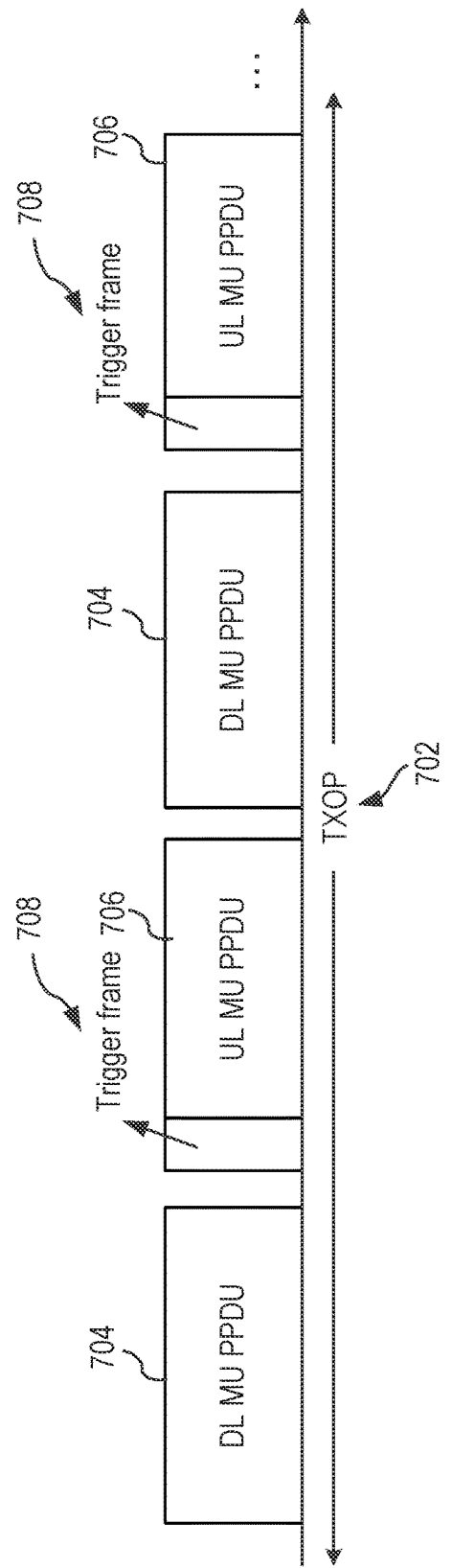
FIG. 7 illustrates an example of downlink and uplink multi-user transmissions during a transmission opportunity (TXOP).

FIG. 7 illustrates a schematic diagram of an example of exchanges of downlink and uplink multi-user transmissions during a transmission opportunity (TXOP). In the example of FIG. 7, DL MU transmissions 704 and UL MU transmissions 706 are shown. As shown in FIG. 7, UL MU PPDUs (e.g., MU-MIMO or OFDMA) 706 are sent as a response to trigger frames 708 transmitted by the AP. Trigger frames 708 may each include STA specific information and assigned resource units that identify the STAs which are supposed to transmit UL MU PPDUs 706 responsive to the trigger frames. Efficient multiplexing acknowledgement transmissions in response to DL/UL MU PPDUs may be performed. Cascaded exchanges of DL/UL MU transmissions within TXOP 702 may be provided as shown in FIG. 7, such that AP/STAs may have chances to exchange any type of frames efficiently and quickly to support MU transmission. In this cascaded operation, different trigger frames may assign different sets of STAs for exchange of data. For example, in an exemplary BSS with five STAs labeled STA1, STA2, STA3, STA4, and STA5, three different trigger frames may trigger responses respectively from a first group of STAs including STA1 and STA2, a second group of STAs including STA3 and STA4, and a third group of STAs including STA3, STA4, and STA5. In various scenarios, each group may include overlapping STAs with other groups if necessary or desired.

Figure 8:
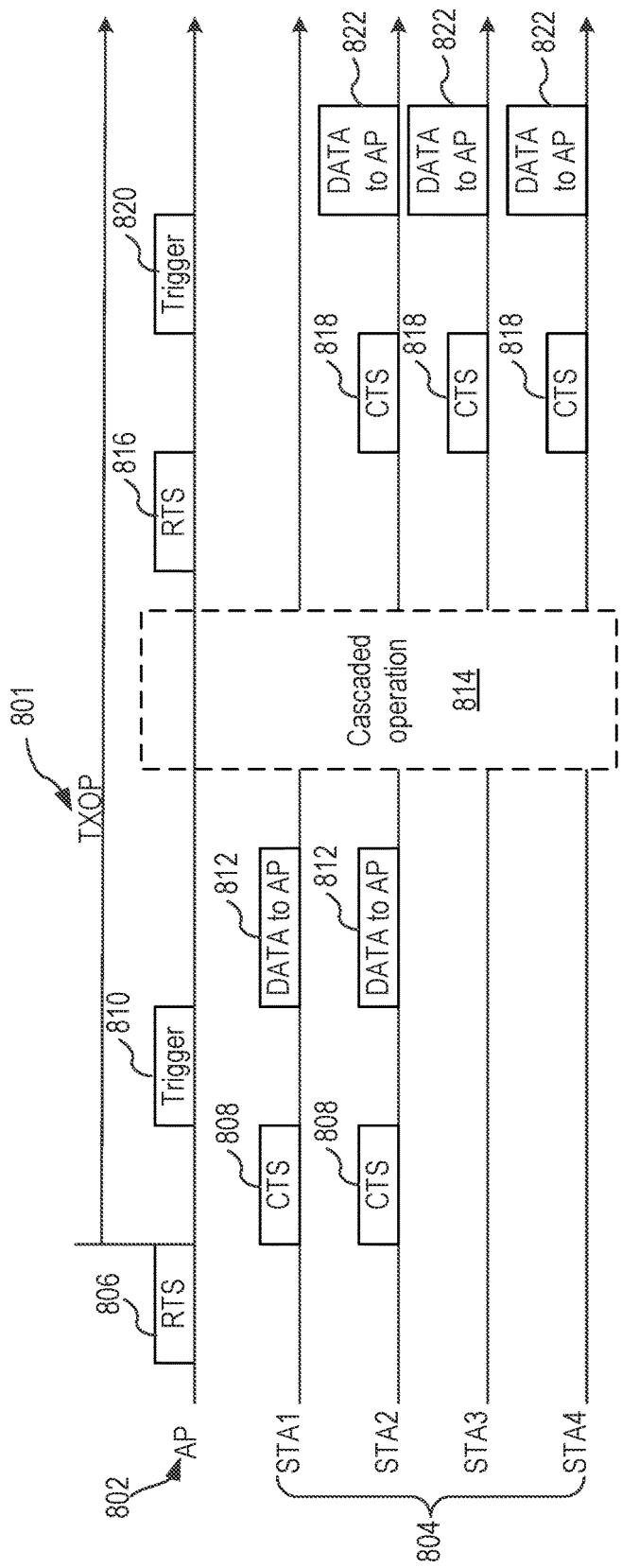
FIG. 8 illustrates an example of exchanges of downlink and uplink transmissions, where request to send (RTS) frames and trigger frames are utilized.

One example of possible cascaded operations for DL/MU transmission is a delayed UL transmission as illustrated in FIG. 8. In this example, because AP 802 intentionally schedules target STAs 804 in UL MU transmission separately within a TXOP 801, delayed UL MU transmission is supported. In the example of FIG. 8, AP 802 tries to receive UL frames from four STAs 804 (e.g., STA1/2/3/4) through two time windows within a TXOP. In particular, before AP 802 sends a trigger frame 810, AP 802 first sends an RTS frame 806, that indicates, in one aspect, that two STAs (e.g., STA1/2) shall send a CTS frame 808, when the NAV is indicated to be idle (e.g., when the NAV count is 0 or when the NAV count is nonzero but the nonbandwidth signaling TA obtained from the TA field of the RTS frame 806 matches the saved TXOP holder address). After securing the procedure from the hidden nodes. AP 802 sends a first trigger frame 810 to STA1 and STA2 that solicits a frame to be sent in UL MU transmission to AP 802. Several frames to/from the AP 802 from/to STAs 804 may then be transmitted between AP 802 and STA1/2 in a cascaded operation 814.

Following the cascaded operation 814, AP 802 may send a second trigger frame 820 to STA2. STA3 and STA4 to solicit those STAs to transmit a respective UL MU PPDU 822 in response. With the protection mechanism illustrated in FIG. 8, AP 802 sends a second RTS frame 816, that indicates, in one aspect, that three STAs 804 (e.g., STA2/3/4) shall send a CTS frame 818, when the NAV is idle (e.g., when the NAV count is 0 or when the NAV count is nonzero but the nonbandwidth signaling TA obtained from the TA field of the RTS frame 816 matches the saved TXOP holder address). AP 802 may then send the second trigger frame 820 to STA2, STA3 and STA4 that solicits a respective frame 822 to be sent in a UL MU transmission. It will be understood by one of ordinary skill in the art that, although data frames 812 and 822 are shown and labeled with common reference numerals, the specific contents of each data frame from each STA may be different.

Even though RTS/CTS protection may be important, especially for UL MU transmission in IEEE 802.11ax where denser deployment scenarios may occur, FIG. 8 shows that it may not be efficient to have both an RTS frame and a trigger frame, particularly when the same target receivers are likely to be addressed by both the RTS frame and the trigger frame.

Figure 9:
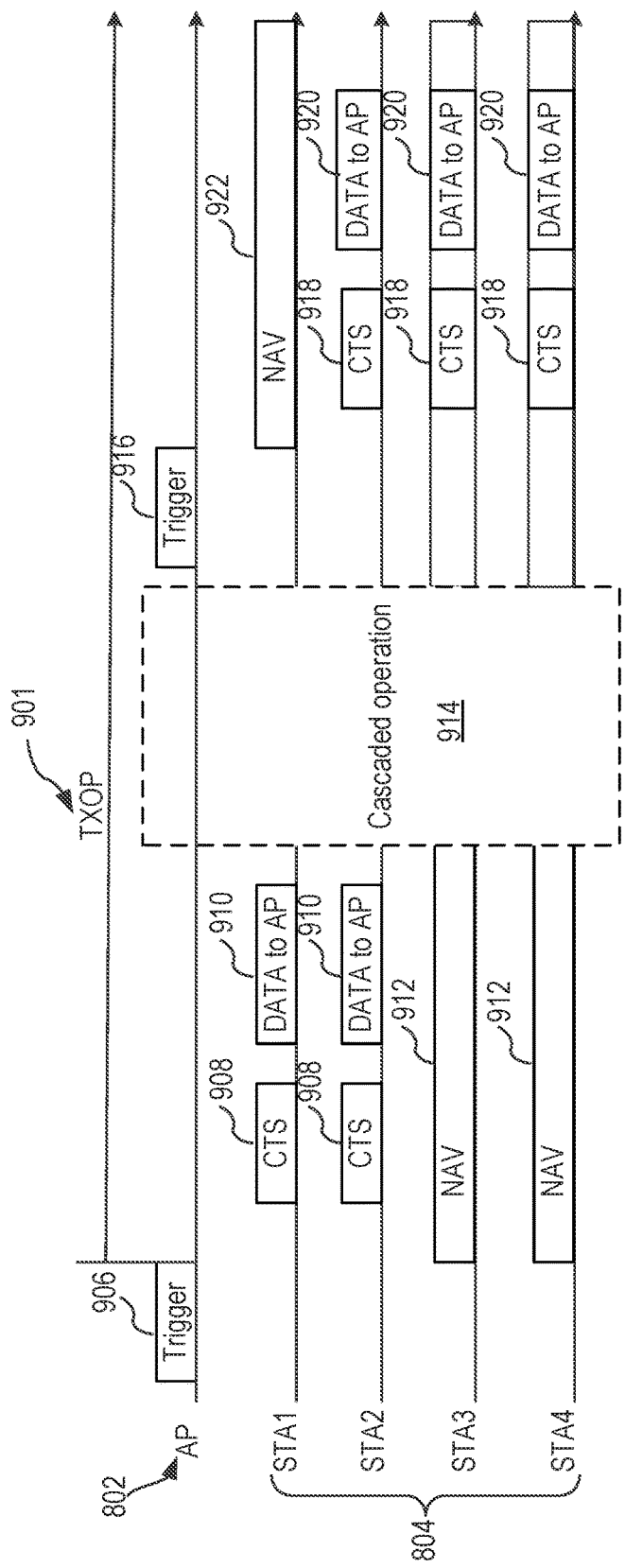
FIG. 9 illustrates an example of exchanges of downlink and uplink transmissions, where trigger frames are utilized.

As shown in FIG. 9, a trigger frame such as a trigger frame 906 may include a subfield that solicits CTS frames 908 rather than using repeated RTS/CTS exchanges right before every MU transmission for a set of STAs as in the example of FIG. 8. In the example of FIG. 9, for a TXOP 901, AP 802 sends a trigger frame 906 to STAs 804 that solicits two different frames to be sent in a row. STAs addressed by the trigger frame 906 (e.g., STA1 and STA2) from the TXOP holder (and serving AP as well) send a CTS frame 908 followed by a data frame 910 such as an UL MU PPDU. STAs 804 not addressed by the trigger frame 906 (e.g., STA3 and STA4) set NAV 912 as shown.

In the example of FIG. 9, following a cascaded operation 914, AP 802 may send a second trigger frame 916 that solicits two different response frames to be sent in a row from STA2, STA3 and STA4. STAs addressed by the trigger frame 916 (e.g., STA2, STA3, and STA4) from the TXOP holder (and serving AP as well) send a CTS frame 918 followed by a data frame 920 such as an UL MU PPDU. STA1, not addressed by the trigger frame 916, sets NAV 922. It will be understood by one of ordinary skill in the art that, although data frames 910 and 920 are shown and labeled with common reference numerals, the specific contents of each data frame from each STA may be different.

Figure 10:
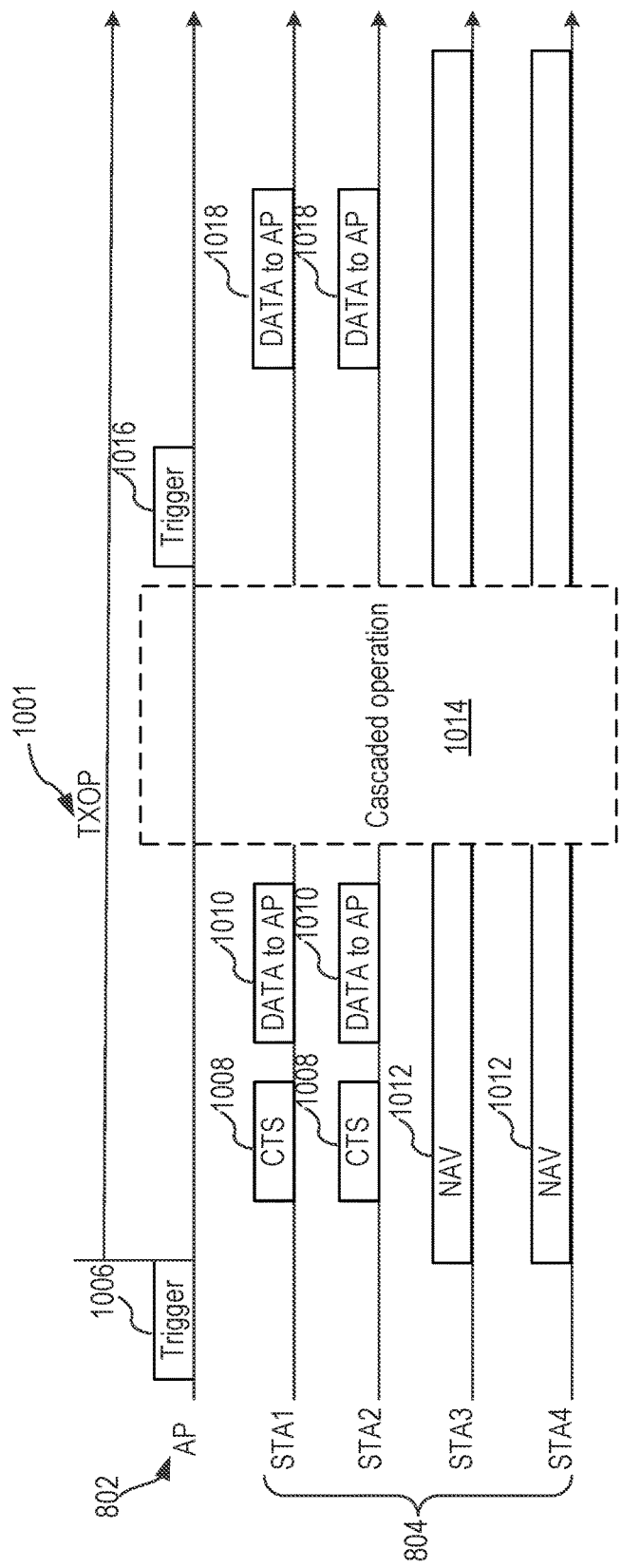
FIG. 10 illustrates another example of exchanges of downlink and uplink transmissions, where trigger frames are utilized.

In some scenarios (e.g., depending on a set of STAs assigned for the delayed MU transmission), CTS transmission may not be desired, as described in the example of FIG. 10 in which STA1 and STA2 are already safe from hidden nodes based on a protecting procedure set by a trigger frame 1006 (e.g., in which STA1 and STA2 send respective CTS frames 1008 and data frames 1010 and STA3 and STA4 set NAV 1012 as in the example of FIG. 10). In the example of FIG. 10, following cascaded operation 1014, the same STAs 804 (e.g., STA1 and STA2) may be addressed by a second trigger frame 1016 during TXOP 1001, in which the trigger frame 1016 solicits a data frame 1018 without soliciting a CTS frame. It will be understood by one of ordinary skill in the art that, although data frames 1010 and 1018 are shown and labeled with common reference numerals, the specific contents of each data frame from each STA may be different.

Figure 11:
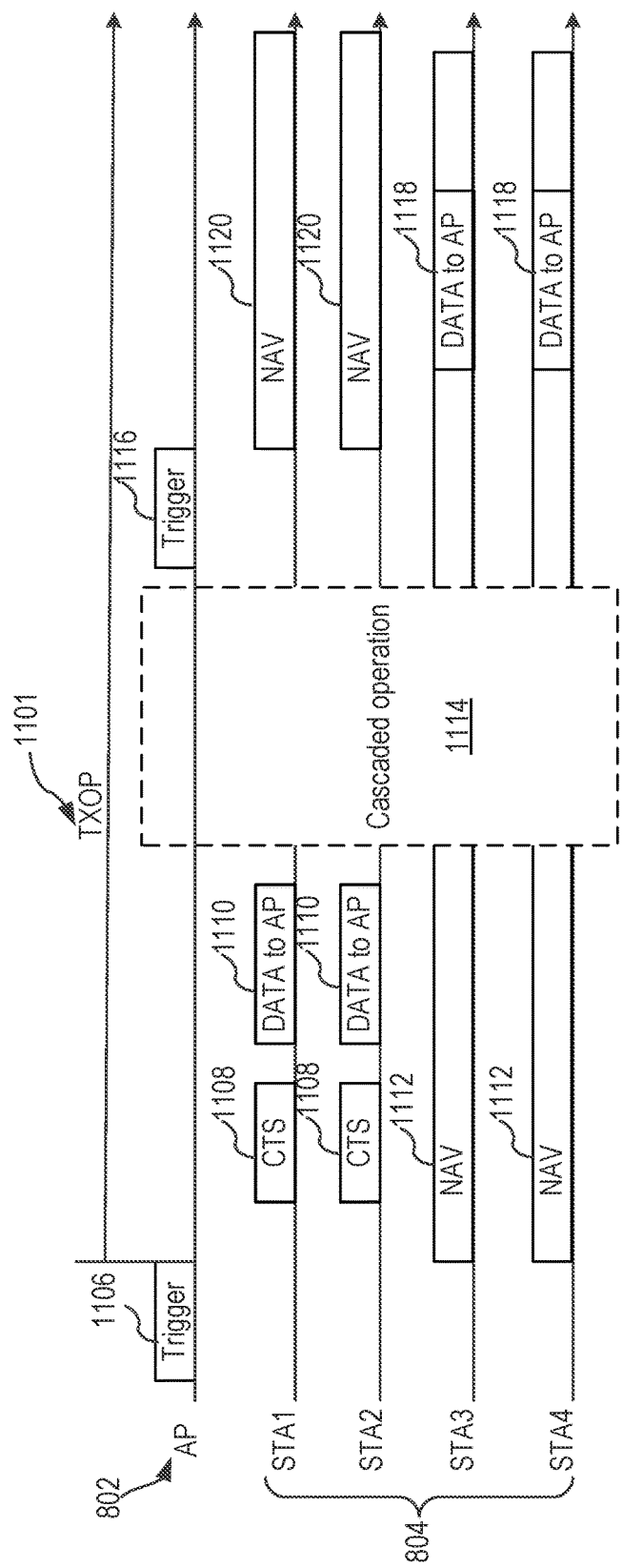
FIG. 11 illustrates another example of exchanges of downlink and uplink transmissions, where trigger frames are utilized.

In yet other scenarios, as shown in the example of FIG. 11, AP 802 may trigger other STAs (e.g., STA3 and STA4 after triggering STA1 and STA2 within a TXOP 1101) without requesting protective transmissions to protect those STAs from hidden nodes (not shown), for example, in scenarios in which a remaining amount of time in a TXOP, such as TXOP 1101, is relatively small in comparison with the duration of the TXOP. In the example of FIG. 11, for a TXOP 1101, AP 802 sends a trigger frame 1106 to STAs 804 that solicits two different frames to be sent in a row. STAs addressed by the trigger frame 1106 (e.g., STA1 and STA2) from the TXOP holder (and serving AP as well) send a CTS frame 1108 followed by a data frame 1110 such as an UL MU PPDU. STAs 804 not addressed by the trigger frame 1106 (e.g., STA3 and STA4) set NAV 1112 as shown.

In the example of FIG. 11, following a cascaded operation 1114, AP 802 may send a second trigger frame 1116 that requests a data frame 1118 such as an UL MU PPM immediately (e.g., without requesting a CTS frame) from STA3 and STA4. STAs addressed by the trigger frame 1116 (e.g., STA3, and STA4) from the TXOP holder (and serving AP as well) send a data frame 1118 such as an UL MU PPDU. STA1 and STA2, not addressed by the trigger frame 1116, set NAV 1120. It will be understood by one of ordinary skill in the art that, although data frames 1110 and 1118 are shown and labeled with common reference numerals, the specific contents of each data frame from each STA may be different.

With respect to NAV checks performed by the STAs, in various aspects, when a STA is addressed only by an RTS, the STA checks whether NAV is idle or not before send a CTS frame. In various aspects, when a STA receives a frame such as a trigger frame addressed to it that requires an immediate response, except for an RTS frame, it transmits the response independent of its NAV. For example, when sending back a control response frame, the transmitter does not check NAV following a trigger frame. However, in order to support an efficient cascaded operation of DL/UL MU transmission as mentioned above within a TXOP, an advanced NAV checking rule may be useful (e.g., for IEEE 802.11ax). To address these issues related to efficient cascaded operation of DL/UL MU transmission, advanced response mechanisms for UL MU transmission are provided herein.

In one embodiment (which is referred to as "E0" simply for convenience), when one or more STAs receives a first frame, the first frame (a) including an indication associated with carrier sensing and (b) soliciting a second frame transmission from addressed target receivers, any STA that is one of the target receivers addressed by the first frame (or each STA addressed by the first frame) may determine whether to perform a carrier sense such as a NAV check as follows:

if the indication associated with the carrier sensing (sometimes referred to herein as a second frame triggered indication or a carrier sensing indication) is set to a first state (e.g., set to 1) in the first frame, the STA checks its NAV state or otherwise performs carrier sensing; or if the indication associated with carrier sensing (e.g., the second frame triggered indication) is set to a second state (e.g., set to 0) in the first frame, the STA does not check NAV or otherwise perform carrier sensing.

In various embodiments as described hereinafter, the first frame may solicit additional transmissions such as a CTS frame and/or, in various embodiments, each STA may perform other operations in determining whether and when to send a response frame and/or what type of response frame to send. However, it should be appreciated that, in each of the embodiments described below, the first frame, which may be a trigger frame, includes a new and beneficial subfield that instructs the STA whether or not to perform a carrier sensing operation.

In one embodiment (which is referred to as "E1" simply for convenience), when one or more STAs receives a first frame that (a) includes a subfield that is a second frame triggered indication (e.g., an indication associated with carrier sensing) and (b) solicits a second frame transmission from one or more target receivers, any STA that is one of the target receivers addressed by the first frame (or each STA addressed by the trigger frame) may determine (a) whether to perform a carrier sense such as a NAV check and (b) whether to send a response frame as follows:

if the second frame triggered indication (e.g., the indication associated with carrier sensing) is set to a first state such as 1 in the first frame, the STA checks its NAV, and, following the NAV check:

if (a) the STA's NAV count is zero or (b) the STA's NAV count is nonzero and the nonbandwidth signaling TA obtained from the TA field of the first frame matches the saved TXOP holder address at the STA, then the STA transmits the second frame (which may be, for example, transmitted simultaneously with one or more other second frames transmitted by a set of addressed STAs whose (a) NAV count is zero or (b) NAV count is nonzero and the nonbandwidth signaling TA obtained from the TA field of the first frame matches the saved TXOP holder address at the STAs), or if the STA's NAV count is nonzero and the nonbandwidth signaling TA obtained from the TA field of the first frame does not match the saved TXOP holder address at the STA, then the STA sets or updates its NAV and does not transmit the second frame; or if the second frame triggered indication e.g., the indication associated with carrier sensing is set to as second state such as 0 in the first frame, the STA does not check its NAV, and:

the STA sends a third frame in UL MU transmission as a response to the first frame. Because the only difference between the above two bulleted scenarios is the carrier sense indication in the first frame being 1 or 0, and the only difference between the resulting operations of the addressed STAs is whether or not to perform a NAV check, in some embodiments, the third frame may be the same as the second frame. However, in other embodiments, the second frame and the third frame may be different (e.g., the third frame may include all of the information of the second frame and additional information such as an acknowledgement or other indicator that the response was sent without a NAV check).

In one embodiment (which is referred to as "E2" simply for convenience a first frame such as a trigger frame may include a subfield that indicates both whether a carrier sense should be performed and whether a CTS frame should be returned. A subfield that indicates both whether a carrier sense should be performed and whether a CTS frame should be returned may sometimes be referred to herein as a CTS triggered indication. When a STA receives a first frame such as a trigger frame that includes a subfield that is a CTS triggered indication, where the first frame also solicits a second frame transmission by one or more target receivers of the first frame, any STA that is one of the target receivers addressed by the first frame (or each STA addressed by the trigger frame) may determine whether to (a) perform a carrier sense such as a NAV check and (b) whether to send a response frame as follows:

if the CTS triggered indication is set to 1 in the first frame, the STA checks its NAV, and following the NAV check:

if (a) the STA's NAV count is zero or (b) the STA's NAV count is nonzero and the nonbandwidth signaling TA obtained from the TA field of the first frame matches the saved TXOP holder address, then the STA transmits a CTS frame and a second frame (which may be, for example, transmitted simultaneously with one or more other CTS frames and data frames transmitted by a set of addressed STAs whose (a) NAV count is zero or (b) NAV count is nonzero and the nonbandwidth signaling TA obtained from the TA field of the first frame matches the saved TXOP holder address at the STAs), or if the NAV count is nonzero and the nonbandwidth signaling TA obtained from the TA field of the first frame does not match the saved TXOP holder address, then the STA sets or updates its NAV and does not transmit the CTS frame; or if the CTS triggered indication is set to 0 in the first frame, the STA does not check NAV, and the STA sends a third frame in UL MU transmission as a response to the first frame (e.g., without sending a CTS frame). Because the only difference between the above two bulleted scenarios is the CTS triggered indication in the first frame being 1 or 0, and the difference between the resulting operations of the addressed STAs is whether or not to perform a NAV check and whether to send a CTS frame, in some embodiments, the third frame may be the same as the second frame. However, in other embodiments, the second frame and the third frame may be different (e.g., the third frame may include all of the information of the second frame and additional information such as an acknowledgement or other indicator that the response was sent without a NAV check).

In one embodiment (which is referred to as "E3" simply for convenience), an RTS frame may include a subfield that includes a CTS triggered indication. When a STA receives a first frame such as a RTS frame that includes a subfield that includes a CTS triggered indication, where the RTS frame solicits a second frame transmission from one or more target receivers of the RTS frame, any STA that is one of the target receivers addressed by the RTS frame (or each STA addressed by the RTS frame) may determine whether to (a) perform a carrier sense such as a NAV check and (b) whether to send a response frame as follows below. Note that the RTS frame may include enough STA specific information and assigned resource units to identify the STAs which are supposed to transmit UL MU PPDUs.

if the CTS triggered indication is set to 1 in the RTS frame, the STA checks its NAV, and following the NAV check:

if (a) the STA's NAV count is zero or (b) the STA's NAV count is nonzero and the nonbandwidth signaling TA obtained from the TA field of the first frame matches the saved TXOP holder address, then the STA transmits a second frame, such as a CTS frame and/or a data frame (which may be, for example, transmitted simultaneously with one or more other CTS frames and/or data frames transmitted by a set of addressed STAs whose (a) NAV count is zero or (b) NAV count is nonzero and the nonbandwidth signaling TA obtained from the TA field of the first frame matches the saved TXOP holder address at the STAs), or if the NAV count is nonzero and the nonbandwidth signaling TA obtained from the TA field of the first frame does not match the saved TXOP holder address, then the STA sets or updates its NAV and does not transmit the second frame; or if CTS triggered indication is set to 0 in the RTS frame, the STA does not check NAV, and the STA sends a third frame in UL MU transmission as a response to the RTS frame. Because the only difference between the above two bulleted scenarios is the CTS triggered indication in the first frame being 1 or 0, and the difference between the resulting operations of the addressed STAs is whether or not to perform a NAV check and whether to send a CTS frame, in some embodiments, the third frame may be the same as the second frame. However, in other embodiments, the second frame and the third frame may be different (e.g., the second frame may include a CTS frame and a data frame in comparison with a third frame that is only a data frame, or the third frame may include all of the information of the second frame and additional information such as an acknowledgement or other indicator that the
response was sent without a NAV check).

In one embodiment (which is referred to as "E4" simply for convenience), when a STA receives a first frame such as a trigger frame that (a) includes a subfield that includes a CTS triggered indication, and (b) solicits a second frame transmission from one or more target receivers of the trigger frame, any STA that is one of the target receivers addressed by the trigger frame (or each STA addressed by the trigger frame) may determine whether to (a) perform a carrier sense such as a NAV check and (b) whether to send a response frame as follows:

if the CTS triggered indication is set to a first value such as 1 in the trigger frame, the STA checks its NAV, and following the NAV check:
  if (a) the STA's NAV count is zero or (b) the STA's NAV count is nonzero and the nonbandwidth signaling TA obtained from the TA field of the first frame matches the saved TXOP holder address at the STA, then the STA transmits a CTS frame and a second frame (which may be, for example, transmitted simultaneously with one or more other CTS frames and additional frames transmitted by a set of addressed STAs whose (a) NAV count is zero or (b) NAV count is nonzero and the nonbandwidth signaling TA obtained from the TA field of the first frame matches the saved TXOP holder address at the STAs), or
  if the NAV count is nonzero and the nonbandwidth signaling TA obtained from the TA field of the first frame does not match the saved TXOP holder address, then the STA sets or updated its NAV and does not send the second frame; or
if the CTS triggered indication is set to a second value such as 0 in the trigger frame, the STA does not check its NAV, and
  the STA sends a third frame such as a UL MU PPDU frame in UL MU transmission as a response to the trigger frame (e.g., without sending a CTS frame). Because the only difference between the above two buffeted scenarios is the CTS triggered indication in the first frame being 1 or 0, and the difference between the resulting operations of the addressed STAs is whether or not to perform a NAV check and whether to send a CTS frame, in some embodiments, the third frame may be the same as the second frame. However, in other embodiments, the second frame and the third frame may be different (e.g., the third frame may include all of the information of the second frame and additional information such as an acknowledgement or other indicator that the response was sent without a NAV check).

Any one of the following conditions may be implemented with any of the embodiments (e.g., any of E0 through E4) described herein.

One condition (which is referred to as "condition A" simply for convenience) is that a STA updates its NAV with the information from a duration field in the received frame, where the RA is not equal to the STA's own MAC address and the received duration is greater than the STA's current NAV value.

Another condition (which is referred to as "condition B" simply for convenience) is that a STA does not update its NAV with the information from the duration field in the received frame, where RA is not equal to the STA's own MAC address and the received duration is greater than the STA's current NAV value, Another condition (which is referred to as "condition C" simply for convenience) is that a STA may send a request frame (REQ) to the AP where this STA may be assigned in the next trigger frame.

Another condition (which is referred to as "condition D" simply for convenience) is that an AP may assign a trigger frame for random access, as discussed in further detail in connection with FIG. 14 such that a scheduled STA is not uniquely indicated.

In one embodiment (e.g., as an extension of E4, which uses E4 and condition A), when a STA receives a trigger frame that (a) includes a subfield that is a CTS triggered indication and (b) solicits a second frame transmission from one or more target receivers of the trigger frame, any STA that is one of the target receivers addressed by the trigger frame (or each STA addressed by the trigger frame) may determine (a) whether to perform a carrier sense such as a NAV check and (b) whether to send a response frame as follows:

if a CTS triggered indication is set to a first value such as 1 in the trigger frame, the STA checks its NAV, and following the NAV check:
  the STA (whose NAV state is idle) transmits a CTS frame and a second frame, (which may be, for example, transmitted simultaneously with one or more other CTS frames and additional frames transmitted by a set of addressed. STAs whose NAV count is zero), or
  the STA does not transmit a CTS frame when the STA's NAV count is nonzero and set by other STAs or AP, or
  otherwise, the STA updates its NAV count; or
if the CTS triggered indication is set to 0 in the trigger frame, the STA does not check NAV, and
  the STA sends a third frame such as a UL MU PPDU frame in UL MU transmission as a response to the trigger frame (e.g., without sending a CTS frame). Because the only difference between the above two bulleted scenarios is the CTS triggered indication in the first frame being 1 or 0, and the difference between the resulting operations of the addressed STAs is whether or not to perform a NAV check and whether to send a CTS frame, in some embodiments, the third frame may be the same as the second frame. However, in other embodiments, the second frame and the third frame may be different (e.g., the third frame may include all of the information of the second frame and additional information such as an acknowledgement or other indicator that the response was sent without a NAV check).

In one embodiment (e.g., as an extension of E4, which uses E4 and condition B), when a STA receives a first frame such as a trigger frame that (a) includes a subfield that is a CTS triggered indication, and (b) solicits a second frame transmission from one or more target receivers of the trigger frame, any STA that is one of the target receivers addressed by the trigger frame (or each STA addressed by the trigger frame) may determine whether to perform a carrier sense such as a NAV check and (b) whether to send a response frame as follows:

if the CTS triggered indication is set to a first value such as 1 in the trigger frame, the STA checks its NAV, and following the NAV check:
  if (a) the STA's NAV count is zero or (b) the STA's NAV count is nonzero and the nonbandwidth signaling TA obtained from the TA field of the first frame matches the saved TXOP holder address at the STA, then the STA transmits a CTS frame and a second frame (which may be, for example, transmitted simultaneously with one or more other CTS frames and one or more additional frames transmitted by a set of addressed STAs whose (a) NAV count is zero or (b) NAV count is nonzero and the nonbandwidth signaling TA obtained from the TA field of the first frame matches the saved TXOP holder address at the STAs), or if the NAV count is nonzero and the nonbandwidth signaling TA obtained from the TA field of the first frame does not match the saved TXOP holder address at the STA, then the STA sets, but sets or updates its NAV and does not send the CTS frame; or if the CTS triggered indication is set to 0 in the trigger frame, the STA does not check NAV, and the STA sends a third frame such as a UL MU PPDU frame in UL MU transmission as a response to the trigger frame. Because the only difference between the above two bulleted scenarios is the CTS triggered indication in the first frame being 1 or 0, and the difference between the resulting operations of the addressed STAs is whether or not to perform a NAV check and whether to send a CTS frame, in some embodiments, the third frame may be the same as the second frame. However, in other embodiments, the second frame and the third frame may be different (e.g., the third frame may include all of the information of the second frame and additional information such as an acknowledgement or other indicator that the response was sent without a NAV check).

Figure 12:
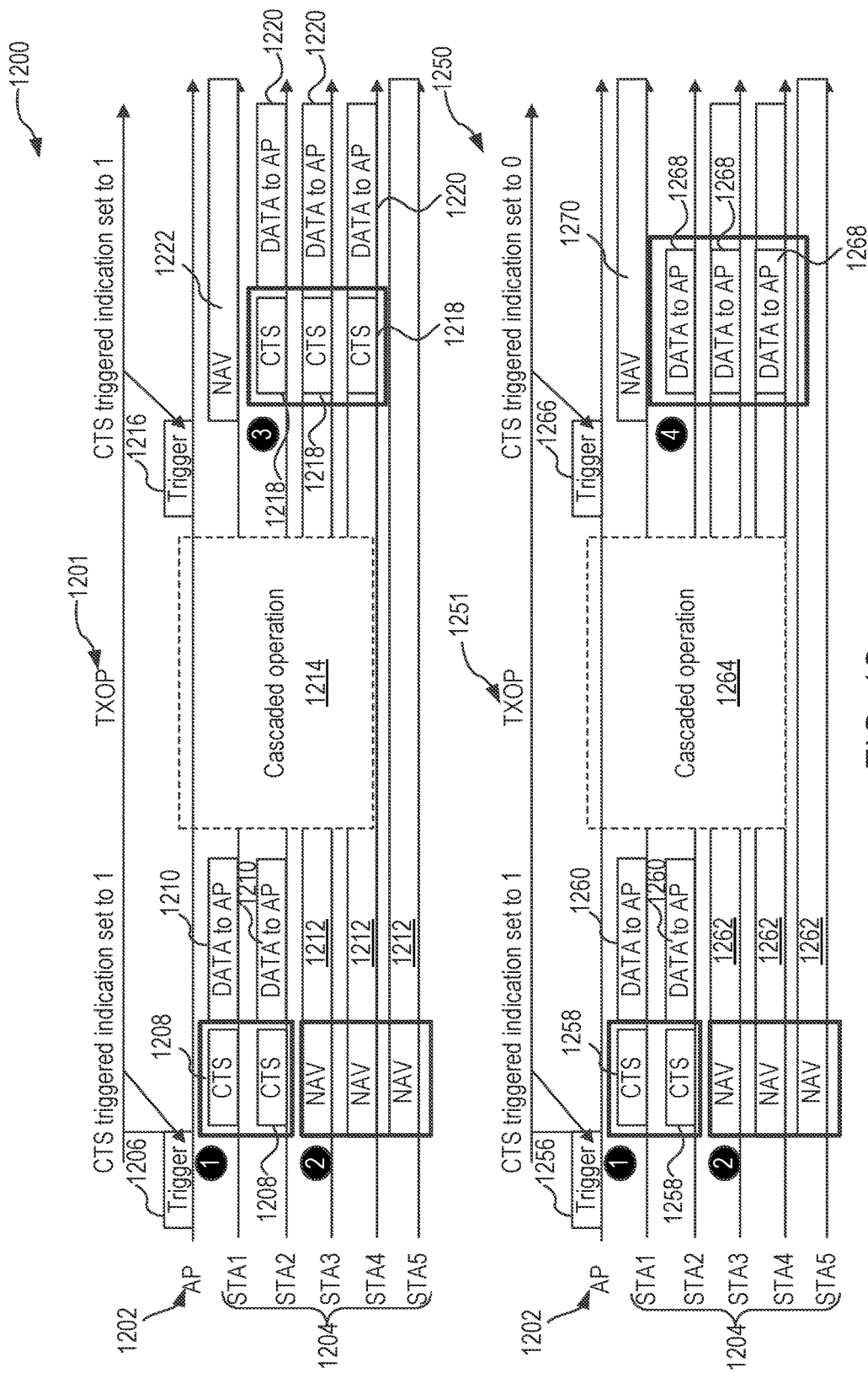
FIG. 12 illustrates examples of exchanges of downlink and uplink transmissions, where trigger frames are utilized.

FIG. 12 illustrates two exemplary exchanges 1200 and 1250 in which an AP 1202 receives UL frames from four STAs 1204 (e.g., STA1, STA2, STA3, and STA4) at least once or twice within a TXOP. In one aspect, FIG. 12 illustrates an example of E4 using condition B, described above. In the example of the exchange 1200, for a TXOP 1201, AP 1202 sends a first trigger frame 1206 including a CTS triggered indication that is set to 1, where the trigger frame 1206 indicates, in one aspect, that two STAs 1204 (e.g., STA1 and STA2) shall check NAV and send a CTS frame 1208 followed by a data frame 1210 such as an UL MU PPDU (e.g., if the NAV is zero or if the TA of the received first trigger frame is set to the basic service set identification (BSSID) of the serving AP that is the TXOP holder). Other STAs 1204 not addressed by the first trigger frame 1206 (e.g., STA3, STA4, and STA5) set NAV 1212.

Several frames to/from the AP from/to STA may then be transmitted between AP and STA1/2 in a cascaded manner during cascaded operations 1214. AP 1202 may then send a second trigger frame 1216 to STA2, STA3, and STA4. In the example of the exchange 1200, AP 1202 sends the second trigger frame 1216 including a CTS triggered indication that is set to 1, where the trigger frame indicates, in one aspect, that three STAs (e.g., STA2, STA3 and STA4) shall send a CTS frame 1218 followed by a data frame 1220 such as a UL MU PPDU (e.g., when the NAV is zero or when the TA of the received trigger frame 1216 is set to the BSSID of the serving AP that is the TXOP holder). Here, it should be noted that the TA of the TXOP holder may be saved by one or more STAs when it is received in the first trigger frame as an initiated exchange sequence. STAs (e.g., STA!) not addressed by the second trigger frame 1216 set NAV 1222.

However, in some cases, for some reasons AP 1202 may send a second trigger frame including a CTS triggered indication that is set to 0, as in the example of the exchange 1250. In the example of the exchange 1250, for a TXOP 1251, AP 1202 sends a first trigger frame 1256 including a CTS triggered indication that is set to 1, where the trigger frame 1256 indicates, in one aspect, that two STAs 1204 (e.g., STA1 and STA2) shall check NAV and send a CTS frame 1258 followed by a data frame 1260 such as an UL MU PPDU (e.g., if the NAV is zero or if the TA of received the first trigger frame is set to the BSSID of the serving AP that is the TXOP holder). Other STAs 1204 not addressed by the first trigger frame 1256 (e.g., STA3, STA4, and STA5) set NAV 1262. Several frames to/from the AP from/to STA may then be transmitted between AP and STA1/2 in a cascaded manner during cascaded. operations 1264, AP 1202 may then send a second trigger frame 1266 to STA2, STA3 and STA4 including a CTS triggered indication that is set to 0 where the trigger frame 1266 indicates, in one aspect, that three STAs (e.g., STA2, STA3 and STA4) shall not check NAV and shall send a data frame 1268 such as an UL MU PPDU as a response independent of their NAV. Other STAs 1204 not addressed by the trigger frame 1266 set NAV 1270, It will be understood by one of ordinary skill in the art that, although data frames 1210, 1220, 1260, and 1268 are shown and labeled with common reference numerals, the specific contents of each data frame from each STA may be different.

Figure 13:
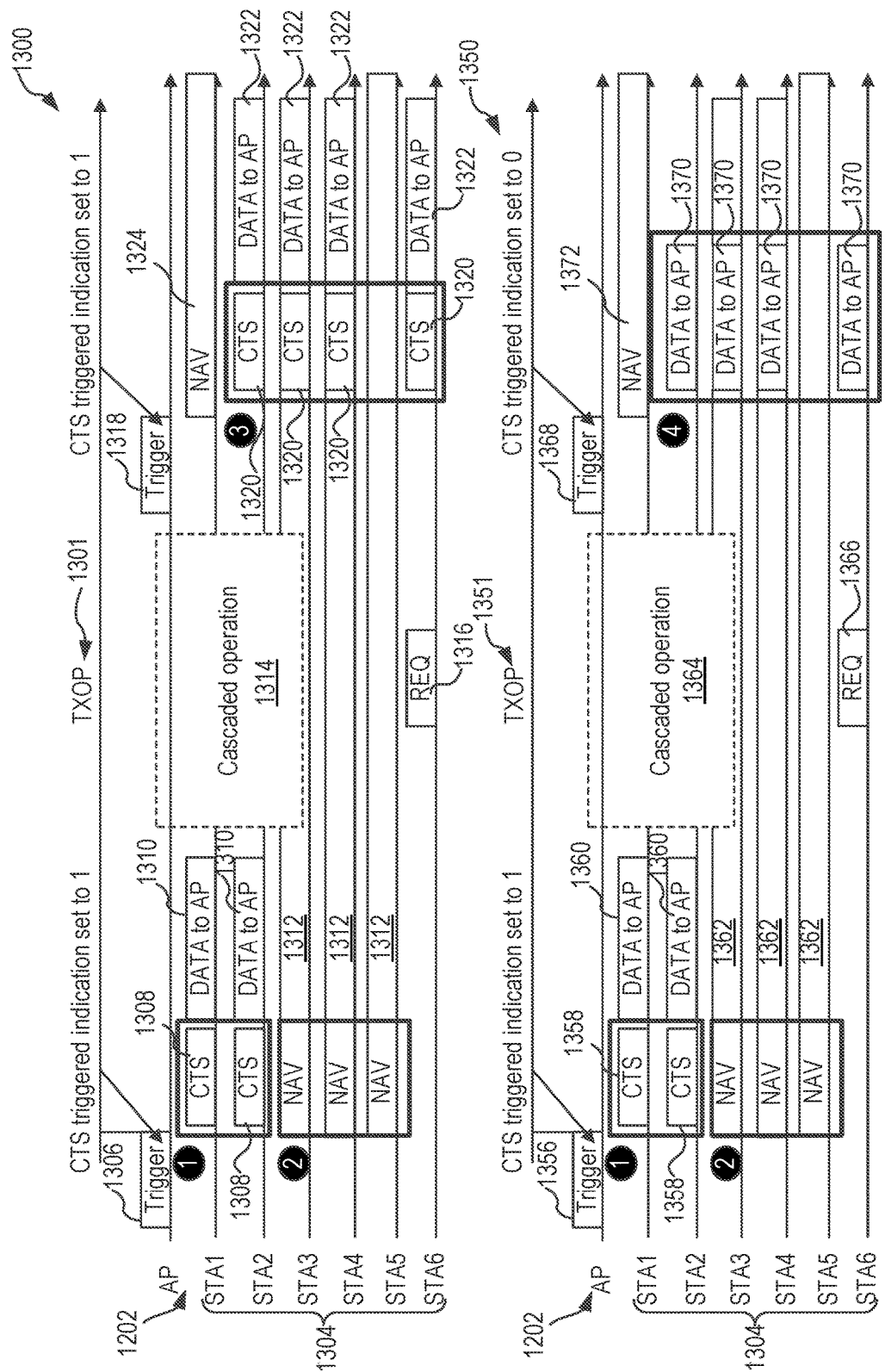
FIG. 13 illustrates additional examples of exchanges of downlink and uplink transmissions, where trigger frames are utilized.

FIG. 13 illustrates two additional exemplary exchanges 1300 and 1350 where an AP 1202 receives UL frames from six STAs 1304 (e.g., STA1, STA2, STA3, STA4, and STA6) at least once or twice within a TXOP. In one aspect, FIG. 13 illustrates an example of E4 using condition C, described above.

In the example of the exchange 1300. AP 1202 sends a first trigger frame 1306 including a CTS triggered indication that is set to 1, where the trigger frame 1306 indicates, in one aspect, that two STAs 1304 (e.g., STA1 and STA2) shall check NAV and shall send a CTS frame 1308 followed by a data frame 1310 such as a UL MU PPDU (e.g., when the NAV is zero or when the TA of received the first trigger frame is set to the BSSID of the serving AP that is the TXOP holder). Other STAs 1304 not addressed by the first trigger frame 1306 set or update NAV 1312.

Several frames to/from the AP from/to STA may be transmitted between AP 1202 and STA1/2 in a cascaded manner during cascaded operation 1314. During that period of time of the cascaded operation 1314, STA6 transmits a REQ frame including its buffer status or QoS parameters to AP 1202. AP 1202 is aware of the fact that an additional trigger frame could assign STA6 with STA2/3/4 in the remaining time of the TXOP 1301. AP 1202 may then send a second trigger frame 1318 to STA2, STA3, STA5, and STA6. AP 1202 may send the second trigger frame 1318 including a CTS triggered indication that is set to 1, where the trigger frame 1318 indicates, in one aspect, that four STAs 1304 shall check NAV and shall send a CTS frame 1320 followed by a data frame 1322 such an UL MU PPDU (e.g., when the NAV is zero or when the TA of received the second trigger frame is set to the BSSID of the serving AP that is also the TXOP holder). It should be noted that the TA of the TXOP holder may be saved by a STA when it is received in the first trigger frame as an initiated exchange sequence.

For STA6, when STA6 receives the trigger frame 1318, because the NAV count for STA6 is 0, the STA sends CTS frame 1320. STAs (e.g., STA1) not addressed by the second trigger frame 1318 set or update NAV 1324.

However, in some cases for some reasons, AP 1202 may send a second trigger frame including a CTS triggered indication that is set to 0, as in the example of the exchange 1350. In the example of the exchange 1350, for a TXOP 1351, AP 1202 sends a first trigger frame 1356 including a CTS triggered indication that is set to 1, where the trigger frame 1356 indicates, in one aspect, that two STAs 1304 (e.g., STA1 and STA2) shall check NAV and shall send a CTS frame 1358 followed by a data frame 1360 such as a UL MU PPDU (e.g., when the NAV is zero or when the TA of received the first trigger frame is set to the BSSID of the serving AP that is the TXOP holder). Other STAs 1304 not addressed by the first trigger frame 1356 set or update NAV 1362.

Several frames to/from the AP from/to STA may be transmitted between AP 1202 and STA1/2 in a cascaded manner during cascaded operation 1364. During that period of time of the cascaded operation 1364, STA6 transmits a REQ frame 1366 including its buffer status or QoS parameters to AP 1202. AP 1202 is aware of the fact that an additional trigger frame could assign STA6 with STA2/3/4 in the remaining time of the TXOP 1351. AP 1202 may then send a second trigger frame 1368 to STA2, STA3, STA4, and STA6. AP 1202 may send the second trigger frame 1368 including a CTS triggered indication that is set to 0 where the trigger frame 1368 indicates, in one aspect, that four STAs 1304 (e.g., STA2, STA3, STA4 and STA6) shall not check NAV and shall send a data frame 1370 such as an UL MU PPDU as a response independent of its NAV. Other STAs 1304 not addressed by this trigger frame 1368 set or update NAV 1372.

It will be understood by one of ordinary skill in the art that, although data frames 1310, 1322, 1360, and 1370 are shown and labeled with common reference numerals, the specific contents of each data frame from each STA may be different.

in one embodiment (e.g., as an example of using condition D), in case an unassociated STA or any STA receives a first frame, such as a TF-R (trigger frame for a random access channel) which implies a channel for which a scheduled STA is not uniquely indicated, when the STA receives the first frame (e.g., TF-R) that (a) includes a subfield that is a CTS triggered indication, and (b) solicits a second frame transmission by the target receivers of the TF-R (or trigger frame for the random access channel), the STA that is not uniquely indicated by the TF-R to be allowed to utilize assigned resource units may determine (a) whether to perform a carrier sense such as a NAV check and (b) whether to send a response frame as follows:

if the CTS triggered indication is set to a first value such as 1 in the first frame, the STA checks its NAV, and following the NAV check:
if (a) the STA's NAV count is zero or (b) the STA's NAV count is nonzero and the nonbandwidth signaling TA obtained from the TA field of the first frame matches the saved TXOP holder address at the STA, then the STA transmits a CTS frame and a second frame (which may be, for example, transmitted simultaneously with one or more other CTS frames and additional frames transmitted by a set of addressed STAs whose (a) NAV count is zero or (b) the NAV count is nonzero and the nonbandwidth signaling TA obtained from the TA field of the first frame matches the saved TXOP holder address at the STAs), or
if the NAV count is nonzero and the nonbandwidth signaling TA obtained from the TA field of the first frame does not match the saved TXOP holder address from the first TF-R, the STA sets or updates NAV and does not send the second frame; or if the CTS triggered indication is set to a second value such as 0 in the first frame, the STA does not check NAV, and:
the STA sends a third frame such as a UL MU PPDU in a UL MU transmission as a response to the first frame without checking its NAV (e.g., without sending a CTS frame). Because the only difference between the above two buffeted scenarios is the carrier sense indication in the first frame being 1 or 0, and the only difference between the resulting operations of the addressed STAs is whether or not to perform a NAV check and whether or not to send a CTS frame, in some embodiments, the third frame may be the same as the second frame. However, in other embodiments, the second frame and the third frame may be different (e.g., the third frame may include all of the information of the second frame and additional information such as an acknowledgement or other indicator that the response was sent without a NAV check).

Figure 14:
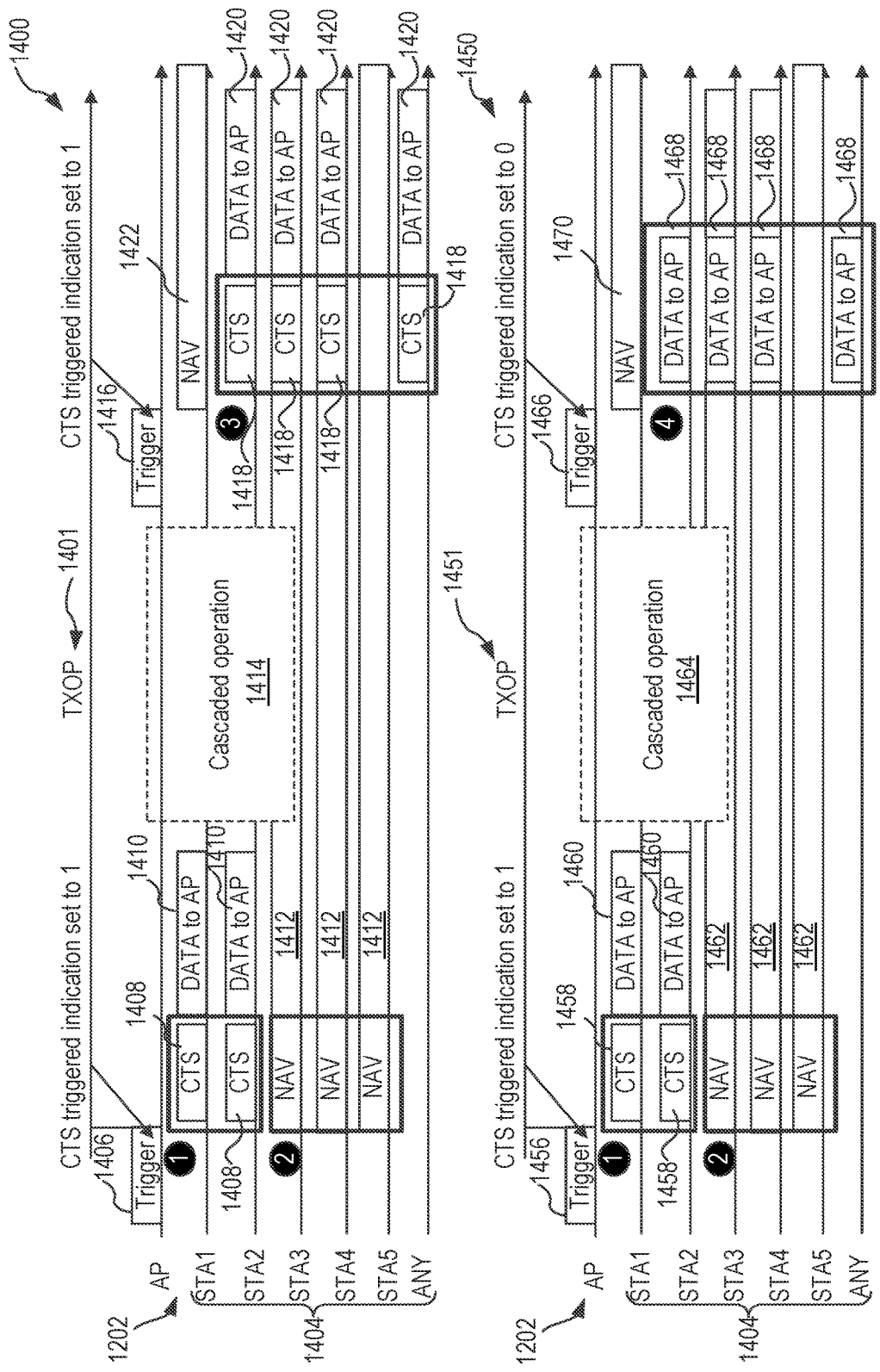
FIG. 14 illustrates additional examples of exchanges of downlink and uplink transmissions, where trigger frames are utilized.

FIG. 14 illustrates two further additional exemplary exchanges 1400 and 1450 where an AP 1202 receives UL frames from five or more STAs 1404 (e.g., STA1, STA2, STA3, STA4, etc.) at least once or twice within a TXOP. In one aspect, FIG. 14 illustrates an example of E4 using condition D, described above.

In the example of the exchange 1400, AP 1202 sends a first trigger frame 1406 including a CTS triggered indication that is set to 1, where the trigger frame 1406 indicates, in one aspect, that two STAs 1404 (e.g., STA1 and STA2) shall check NAV and shall send a CTS frame 1408 followed by a data frame 1410 such as an UL MU PPDU (e.g., when the NAV is zero or when the TA of the received first trigger frame is set to the BSSID of the serving AP that is the TXOP holder). Other STAs 1404 not addressed by the first trigger frame 1406 set or update NAV 1412.

Several frames to/from the AP from/to STA may then be transmitted between AP and STA1/2 in a cascaded manner during cascaded operation 1414. During the period of time of the cascaded operation 1414, AP 1202 may happen to find out that sonic resource is not fitted to STAs 1404 (e.g., STA2/3/4) to be scheduled in UL MU transmission. AP 1202 may open this unfitted resource to any STAs 1404, including a STA that is currently unassociated with the intended AP. AP 1202 may be aware of the fact that an additional TE-R could assign any STA (e.g., STA6) with STA2/3/4 in the remaining time of TXOP 1401. AP 1202 may then send a second trigger frame 1466 as TF-R to STA2, STA3, STA4, and STA6.

AP 1202 may send the second trigger frame 1416 including a CTS triggered indication that is set to 1, where the trigger frame indicates, in one aspect, that four STAs 1404 shall check NAV and shall send a CTS frame 1418 followed by a data frame 1420 such as a UL MU PPDU (e.g., when the NAV is zero or when the TA of the received second trigger frame is set to the BSSID of the serving AP that is the TXOP holder). It should be noted that the TA of the TXOP holder may be stored by a STA when it is received in the first trigger frame as an initiated exchange sequence.

For STAG, when STA6 receives the trigger frame 1416, because the NAV count is 0, the STA sends a CTS frame 1418. STAs 1404 (e.g., STA1) not addressed by the second trigger frame 1416 set or update NAV 1422.

However, in some cases, for some reasons AP 1202 may send a second trigger frame including a CTS triggered indication that set to 0, as in the example of the exchange 1450. In the example of the exchange 1450, AP 1202 sends a first trigger frame 1456 including a CTS triggered indication that is set to 1, where the trigger frame 1456 indicates, in one aspect, that two STAs 1404 (e.g., STA1 and STA2) shall check NAV and shall send a CTS frame 1458 followed by a data frame 1460 such as an UL MU PPDU (e.g., when the NAV is zero or when the TA of received the first trigger frame is set to the BSSID of the serving AP that is the TXOP holder). Other STAs 1404 not addressed by the first trigger frame 1456 set or update NAV 1462.

Several frames to/from the AP from/to STA may then be transmitted between AP and STA1/2 in a cascaded manner during cascaded operation 1464. During the period of time of the cascaded operation 1464, AP 1202 may happen to find out that some resource is not fitted to STAs 1404 (e.g., STA2/3/4) to be scheduled in UL MU transmission. AP 1202 may open this unfitted resource to any STAs 1404 including a STA that is currently unassociated with the intended AP. AP 1202 may be aware of the fact that an additional TE-R could assign any STA (e.g., STA6) with STA2/3/4 in the remaining time of TXOP 1451. AP 1202 may then send a second trigger frame 1466 as TF-R to STA2, STA3, STA4, and STA6, AP 1202 may send the second trigger frame 1466 including a CTS triggered indication that is set to 0, where the trigger frame 1466 indicates, in one aspect, that four STAs (e.g., STA2, STA3, STA4 and STA6) shall not check NAV and shall send a data frame 1468 such as an UL MU PPDU as a response, independent of its NAV. Other STAs not addressed by this trigger frame 1466 set or update NAV 1470.

It will be understood by one of ordinary skill in the art that, although data frames 1410, 1422, 1460, and 1470 are shown and labeled with common reference numerals, the specific contents of each data frame from each STA may be different.

It should be appreciated that, although various examples have been described in connection with E1, E2, E3, and E4 and conditions A, B, C, and D above in which a first frame includes a CTS triggered indication (e.g., a subfield that indicates both whether a carrier sense should be performed and whether a CTS frame should be returned), these examples are merely illustrative. In any of the examples, E1, E2, E3, and E4 and conditions A, B, C, and D described above, the first frame may include, instead of a CTS triggered indication, a second frame triggered indication (e.g., an indication associated with a carrier sense) without including any instructions regarding a CTS frame.

Referring to FIGS. 8 through 14, in one or more aspects, a frame labeled as "DATA to AP" is not limited to a data frame and can be any type of frame, such as a control frame, a management frame, or a data frame.

In one or more embodiments, a method of sending a UL MU frame from a STA is disclosed, where the method includes: receiving a first frame, where: (a) the first frame solicits an UL MU transmission as an immediate response, (b) target receivers of the first frame includes the STA, (c) the first frame includes adoration of a response frame, and (d) the first frame further includes a first indication; transmitting a second frame without channel assessment, if the first indication is set to the first state; transmitting a third frame, if the first indication is not set to the first state and a channel assessment result is idle; and abstaining from transmitting a third frame until the end of the duration of the response frame, if the first indication is not set to the first state and the channel assessment result is not idle.

In one or more embodiments, the second frame is a CTS frame.

In one or more embodiments, the channel assessment is a virtual CS mechanism (NAV).

In one or more embodiments, the method further includes: transmitting the third frame in a predetermined time after transmitting the second frame, if the first indication is set to the first state.

In one or more embodiments, the second frame is the same frame as the third frame.

In one or more embodiments, the first frame is an RTS frame.

In one or more embodiments, the RA of the RTS frame is set to a broadcast address and the number of the target receivers of the RTS frame is more than one.

In one or more embodiments, the first frame is a trigger frame.

in one or more embodiments, the trigger frame further includes information on the resource allocation that the STA is going to use in sending the third frame.

One or more implementations of the disclosed subject matter support more flexible UL/DL MU transmission in a cascaded manner with a modified or newly defined mechanism as described herein. The subject technology may be utilized, among others, in Institute of Electrical and Electronics Engineers (IEEE) systems, such as high throughput (HT), very high throughput (VHT), and high efficiency (HE) WLAN.

In one or more aspects, carrier sense (CS) may refer to channel assessment(CA) or clear channel assessment (CCA). A carrier sense may include a physical carrier sense and/or a virtual carrier sense. A physical carrier sense include an energy detect (ED). A virtual carrier sense may include a network allocation vector (NAV) check. In one or more aspects, a subfield of a trigger frame, such as a carrier sense (CS) required subfield, may include an indication associated with carrier sense. In one or more aspects, the indication may indicate whether the STA(s) that receive the trigger frame are required to consider the state of the medium in determining whether or not to respond to the trigger frame. In one or more aspects, the indication may indicate whether the STA(s) are required to perform a carrier sense in determining whether or not to respond to the trigger frame. In one or more aspects, the indication may indicate whether the STA(s) are required to consider the state of carrier sense in determining whether or not to respond to the trigger frame. The terms carrier sense, physical carrier sense, and virtual carrier sense may be sometimes referred to as carrier sensing, physical carrier sensing, and virtual carrier sensing, respectively. In one or more aspects, the PHY shall indicate a medium busy condition when a carrier sense/clear channel assessment (CS/CCA) mechanism detects a channel busy condition. When a carrier sense/clear channel assessment (CS/CCA) mechanism detects a channel idle condition, the PHY shall indicate a medium idle condition. In one or more aspects, the NAV may be idle when the NAV count is 0 or when the NAV count is nonzero but the nonbandwidth signaling TA obtained from the TA field of the trigger frame matches the saved TXOP holder address.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 15A:
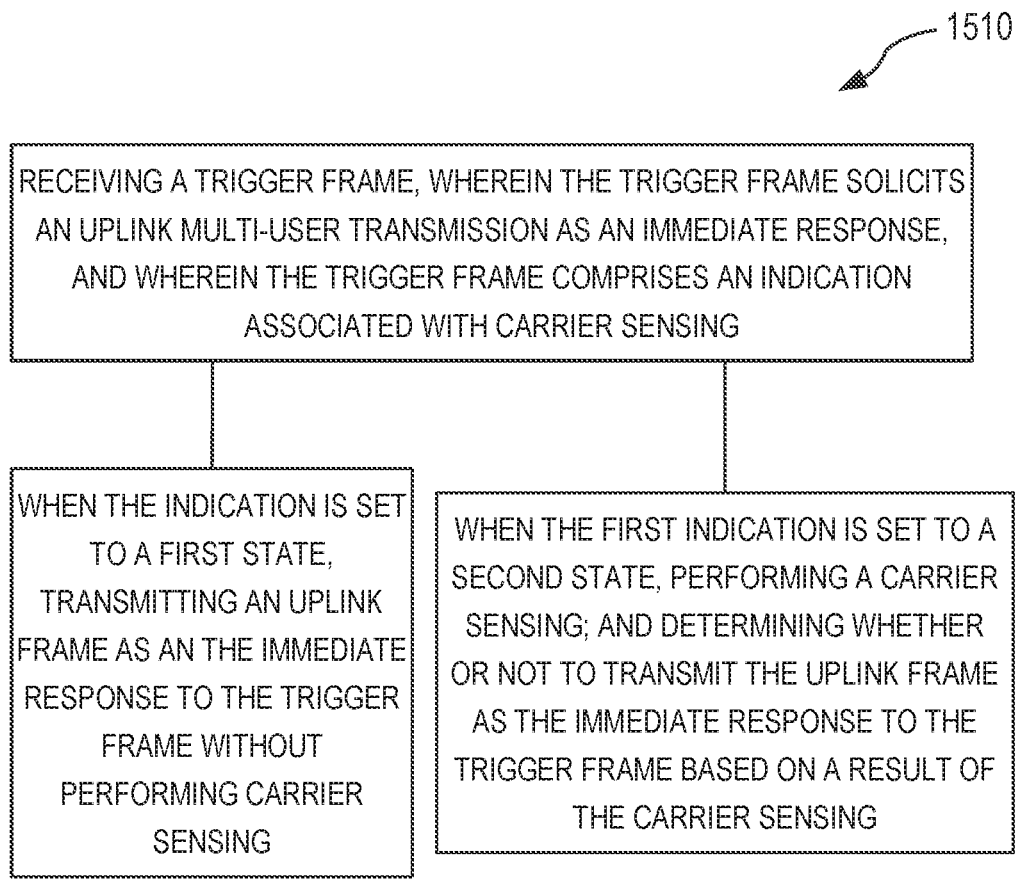
FIGS. 15A, 15B, and 15C illustrate flow charts of examples of methods for facilitating wireless communication for multi-user transmission.
Figure 15B:
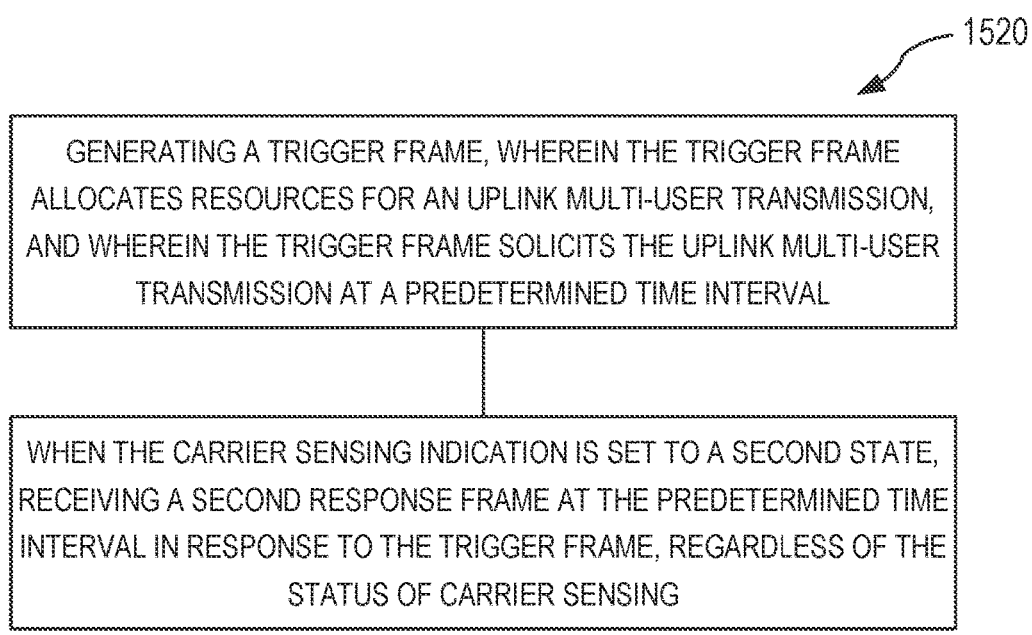
Figure 15C:
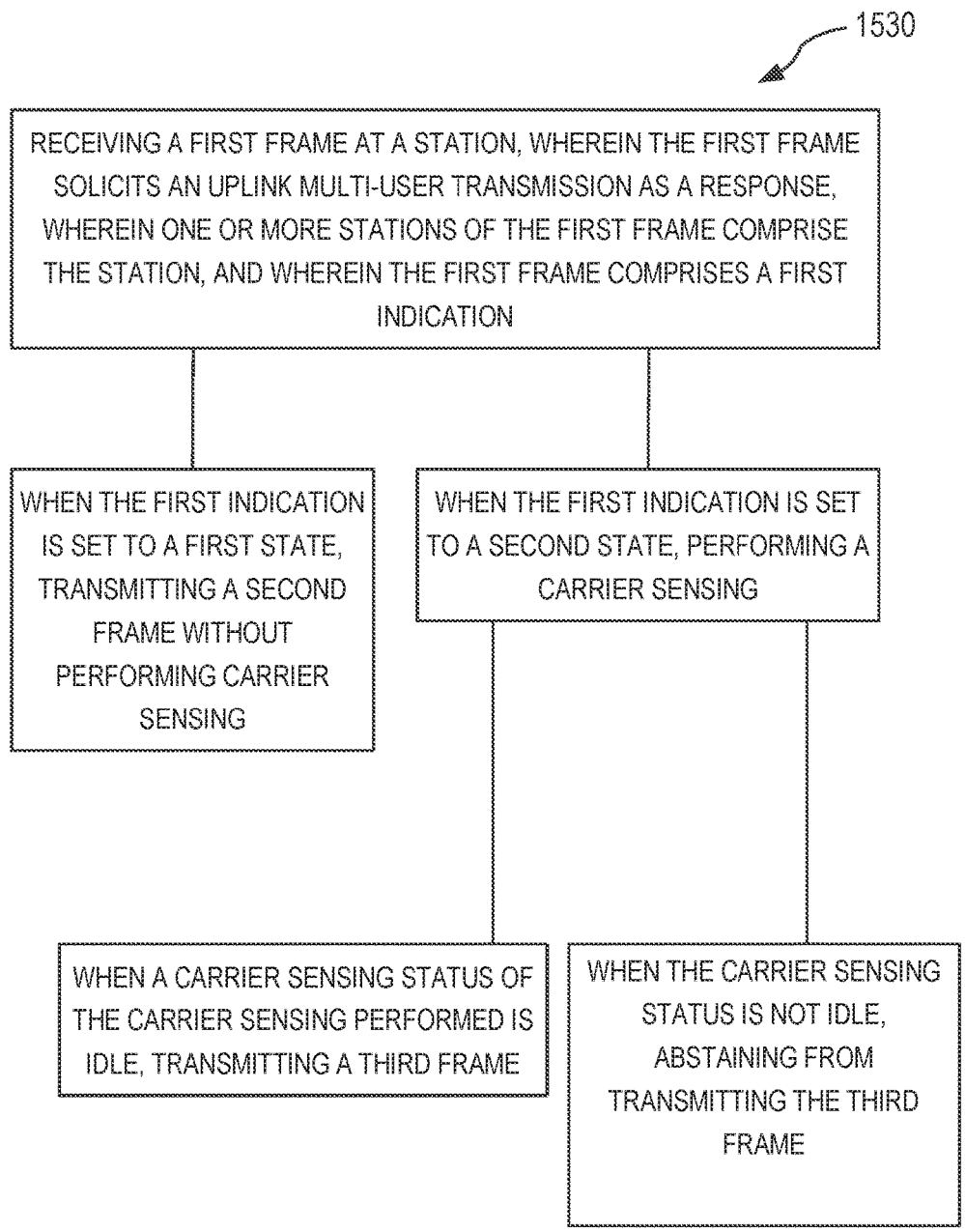

FIGS. 15A, 15B, and 15C illustrate flow charts of examples of methods for facilitating wireless communication. For explanatory and illustration purposes, the example processes 1510, 1520 and 1530 may be performed by the wireless communication devices 111-115 of FIG. I and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1510, 1520 and 1530 are not limited to the wireless communication devices 111-115 of FIG. 1 or their components, and the example processes 1510, 1520 and 1530 may be performed by some of the devices shown in FIG. 1, or other devices or components. Further for explanatory and illustration purposes, the blocks of the example processes 1510, 1520 and 1530 are described herein as occurring in serial or linearly. However, multiple blocks of the example processes 1510, 1520, and 1530 may occur in parallel, in addition, the blocks of the example processes 1510, 1520, and 1530 need not be performed in the order shown and/or one or more of the blocks/actions of the example processes 1510, 1520, and 1530 need not be performed.

Various examples of aspects of the disclosure are described below as clauses for convenience. These are provided as examples, and do not limit the subject technology. As an example, some of the clauses described below are illustrated in FIGS. 15A, 15B, and 15C.

Clause A. A station for facilitating multi-user communication in a wireless network, the station comprising: one or more memories; and one or more processors coupled to the one or more memories, the one or more processors configured to cause: receiving a trigger frame, wherein the trigger frame solicits art uplink multi-user transmission as an immediate response, and wherein the trigger frame comprises an indication associated with carrier sensing; when the indication is set to a first state, transmitting an uplink frame as an the immediate response to the trigger frame without performing carrier sensing; and when the indication is set to a second state: performing a carrier sensing; and determining whether or not to transmit the uplink frame as the immediate response to the trigger frame based on a result of the carrier sensing Clause B. An access point for facilitating multi-user communication in a wireless network, the access point comprising: one or more memories; and one or more processors coupled to the one or more memories, the one or more processors configured to cause: generating a trigger frame, wherein the trigger frame allocates resource for an uplink multi-user transmission, and wherein the trigger frame solicits the uplink multi-user transmission at a predetermined time interval; and transmitting the trigger frame to one or more stations, wherein the trigger frame comprises a carrier sensing indication that indicates whether the one or more stations are required to consider a status of carrier sensing in determining whether or not to respond to the trigger frame.

Clause C. A computer-implemented method of facilitating multi-user communication in a wireless network, the method comprising: receiving a first frame at a station, wherein the first frame solicits an uplink multi-user transmission as a response, wherein one or more stations of the first frame comprise the station, and wherein the first frame comprises a first indication; when the first indication is set to a first state, transmitting a second frame without performing carrier sensing; and when the first indication is set to a second state: performing a earner sensing; when a carrier sensing status of the carrier sensing performed is idle, transmitting a third frame, and when the carrier sensing status is not idle, abstaining from transmitting the third frame for a period of time.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) one or more processors (e.g., 210 or one or more portions), wherein the one or more memories store instructions that, when executed by the one or more processors, cause the one or more processors to perform one or more methods or operations described herein.

An apparatus or a station comprising means e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (c.a., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the " or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the fill scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:
1. A station for facilitating multi-user communication in a wireless network, the station comprising:
one or more memories; and
one or more processors coupled to the one or more memories, the one or more processors configured to cause:

receiving a trigger frame, wherein the trigger frame solicits an uplink multi-user transmission as an immediate response, and wherein the trigger frame comprises an indication that indicates both whether carrier sensing is to be performed and whether a clear-to-send (CTS) frame is to be returned, by the station;

when the indication is set to a first state, transmitting an uplink frame as the immediate response to the trigger frame without performing carrier sensing, wherein the uplink frame excludes the CTS frame and indicates that the immediate response is sent without a network allocation vector (NAV) check; and when the indication is set to a second state:
performing carrier sensing;
determining whether or not to transmit the uplink frame as the immediate response to the trigger frame based on a result of the carrier sensing; and
transmitting the uplink frame following the carrier sensing, wherein the uplink frame includes the CTS frame.

2. The station of claim 1, wherein the transmitting the uplink frame is performed when the result of the carrier sensing is idle, wherein the one or more processors are further configured to cause:
when the result of the carrier sensing is not idle, abstaining from transmitting the uplink frame as the immediate response to the trigger frame.

3. The station of claim 1, wherein performing the carrier sensing comprises performing a NAV check.

4. The station of claim 3, wherein performing the carrier sensing includes determining whether a NAV count is zero.

5. The station of claim 3, wherein determining whether or not to transmit the uplink frame as the immediate response to the trigger frame based on the result of the carrier sensing comprises determining whether a transmitter address obtained from the trigger frame matches a transmit opportunity (TXOP) holder address.

6. The station of claim 1, wherein performing the carrier sensing comprises performing energy detection (ED) of a wireless medium upon which the uplink frame is to be transmitted.

7. The station of claim 1, wherein the trigger frame is a request-to-send (RTS) trigger frame.

8. The station of claim 7, wherein the uplink frame includes the CTS frame followed by a data frame, when the result of the carrier sensing is idle.

9. The station of claim 1, wherein performing the carrier sensing comprises performing a NAV check, and wherein the one or more processors are further configured to cause:
when the result of the NAV check is idle, transmitting the uplink frame as the immediate response to the trigger frame; and
when the result of the NAV check is not idle, abstaining from transmitting the uplink frame as the immediate response to the trigger frame.

10. The station of claim 9, wherein the trigger frame is a trigger frame for random access.

11. The station of claim 1, wherein the one or more processors are further configured to cause:
when the result of the carrier sensing is idle, transmitting the uplink frame as the immediate response to the trigger frame.

12. An access point for facilitating multi-user communication in a wireless network, the access point comprising:
one or more memories; and
one or more processors coupled to the one or more memories, the one or more processors configured to cause:
generating a trigger frame, wherein the trigger frame allocates resources for an uplink multi-user transmission, and wherein the trigger frame solicits the uplink multi-user transmission at a predetermined time interval;
transmitting the trigger frame to one or more stations, wherein the trigger frame comprises a carrier sensing indication that indicates both whether the one or more stations are required to consider a status of carrier sensing in determining whether or not to respond to the trigger frame and whether a clear-to-send (CTS) frame is to be returned, by the one or more stations; and
processing a received uplink frame as part of the uplink multi-user transmission, wherein the received uplink frame excludes the CTS frame and indicates that a response to the trigger frame is sent without a network allocation vector (NAV) check when the carrier sensing indication indicates that the one or more stations are not required to consider a status of carrier sensing.

13. The access point of claim 12, wherein the one or more processors are configured to cause:
setting the carrier sensing indication to a state that indicates that the one or more stations are required to consider the status of the carrier sensing in determining whether to respond to the trigger frame.

14. The access point of claim 12, wherein the one or more processors are configured to cause:
setting the carrier sensing indication to a state that indicates that the one or more stations are to respond to the trigger frame without performing the carrier sensing.

15. The access point of claim 14, wherein performing the carrier sensing comprises checking a status of a NAV value.

16. The access point of claim 12, wherein the trigger frame includes a nonbandwidth signaling transmitter address of the access point.

17. The access point of claim 12, wherein the carrier sensing indication is either one or zero, and is provided in a subfield of the trigger frame.

18. A computer-implemented method of facilitating multi-user communication in a wireless network, the method comprising:
receiving a first frame at a station, wherein the first frame solicits an uplink multi-user transmission as a response, wherein one or more stations of the first frame comprise the station, and wherein the first frame comprises a first indication that indicates both whether carrier sensing is to be performed and whether a clear-to-send (CTS) frame is to be returned, by the station;
when the first indication is set to a first state, transmitting a second frame without performing carrier sensing, wherein the uplink frame excludes the CTS frame and indicates that the response is sent without a network allocation vector (NAV) check; and
when the first indication is set to a second state:
performing carrier sensing;
when a carrier sensing status of the carrier sensing performed is idle, transmitting a third frame, wherein the third frame includes the CTS frame; and
when the carrier sensing status is not idle, abstaining from transmitting the third frame for a period of time.

19. The method of claim 18, wherein performing the carrier sensing comprises performing a NAV check.

20. The method of claim 18, wherein performing the carrier sensing comprises performing energy detection (ED) of a wireless medium upon which the uplink frame is to be transmitted.

* * * * *